United States Patent
Jaster

(10) Patent No.: US 10,357,857 B2
(45) Date of Patent: Jul. 23, 2019

(54) PARALLEL ARM FABRICATION APPARATUS AND SYSTEM FOR FACILITATING THREE DIMENSIONAL MOTION OF AN OBJECT

(71) Applicant: Veloce Labs, LLC

(72) Inventor: Mark Jaster, Rexburg, ID (US)

(73) Assignee: Printspace 3D, Rexburg, ID (US)

(*) Notice: Subject to any disclaimer, the term of this patent is extended or adjusted under 35 U.S.C. 154(b) by 833 days.

(21) Appl. No.: 14/829,464

(22) Filed: Aug. 18, 2015

(65) Prior Publication Data
US 2017/0050278 A1 Feb. 23, 2017

(51) Int. Cl.
| | |
|---|---|
| *B29C 67/00* | (2017.01) |
| *B25J 9/00* | (2006.01) |
| *B25J 17/02* | (2006.01) |
| *B23Q 1/01* | (2006.01) |
| *B33Y 30/00* | (2015.01) |
| *B33Y 10/00* | (2015.01) |
| *B25J 9/10* | (2006.01) |
| *B25J 11/00* | (2006.01) |
| *B23Q 1/54* | (2006.01) |
| *B29C 64/112* | (2017.01) |
| *B29C 64/20* | (2017.01) |

(52) U.S. Cl.
CPC .......... *B23Q 1/017* (2013.01); *B23Q 1/5462* (2013.01); *B25J 9/0039* (2013.01); *B25J 9/0042* (2013.01); *B25J 9/1045* (2013.01); *B25J 11/00* (2013.01); *B29C 64/112* (2017.08); *B29C 64/20* (2017.08); *B33Y 10/00* (2014.12); *B33Y 30/00* (2014.12); *Y10S 901/14* (2013.01)

(58) Field of Classification Search
CPC ......... B33Y 10/00; B33Y 30/00; B29C 64/00; B23Q 1/5462
See application file for complete search history.

(56) References Cited

U.S. PATENT DOCUMENTS

| | | | | |
|---|---|---|---|---|
| 6,577,093 B1 * | 6/2003 | Hvittfeldt | ............ | B25J 17/0266 318/568.11 |
| 7,837,458 B2 * | 11/2010 | Perret | ................... | B29C 64/153 264/113 |
| 8,134,324 B2 * | 3/2012 | Nishida | .................. | B25J 9/1623 318/567 |
| 2006/0182602 A1 * | 8/2006 | Schuler | ................ | B23Q 1/5456 414/735 |

(Continued)

*Primary Examiner* — Nahida Sultana
(74) *Attorney, Agent, or Firm* — Ascentage Patent Law, LLC; Travis Lee Johnson

(57) ABSTRACT

A fabrication apparatus and system for facilitating three dimensional motion of an object within the system. The apparatus and system utilizing a delta style manipulation system having a plurality of guide rails and corresponding gliders. The guide rails having an extended axial body having rigid side wall with a hollow interior cavity. The guide rail further including a key or slot extending through the side wall, the key or slot being parallel to a main central axis of each guide rail. A corresponding glider is provided for each guide rail, each glider having an exterior portion and an interior portion, wherein the exterior portion substantially encompasses the guide rail about an outer surface, and the interior portion being coupled to a driving mechanism which facilitates axial motion of the glider about the guide rail.

10 Claims, 27 Drawing Sheets

(56) References Cited

U.S. PATENT DOCUMENTS

| | | | | |
|---|---|---|---|---|
| 2016/0096329 A1* | 4/2016 | Ko | ............ | B33Y 30/00 |
| | | | | 264/129 |
| 2016/0318248 A1* | 11/2016 | Susnjara | ............ | B29C 64/106 |
| 2017/0144379 A1* | 5/2017 | Sung | ............ | B33Y 50/02 |
| 2017/0297322 A1* | 10/2017 | Liao | ............ | B33Y 50/02 |
| 2018/0236713 A1* | 8/2018 | Robert | ............ | B29C 64/393 |

\* cited by examiner

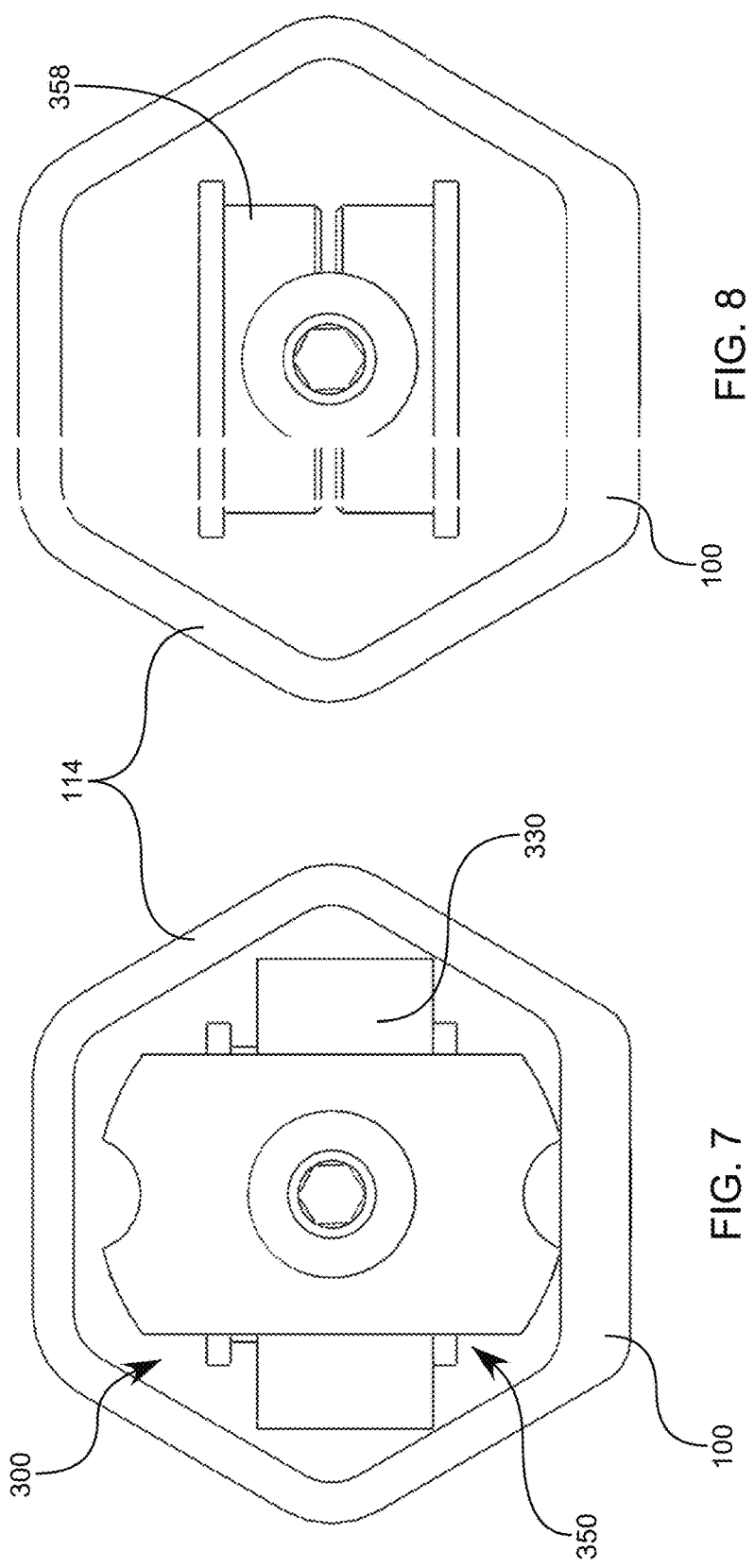

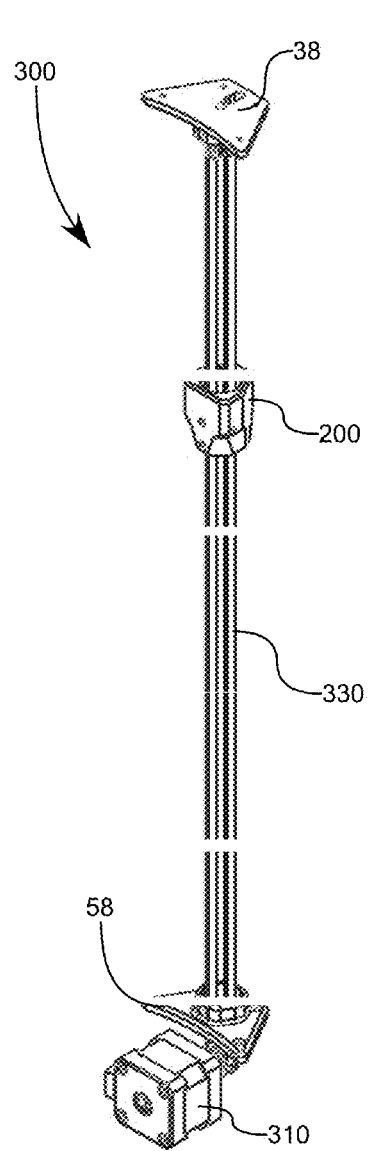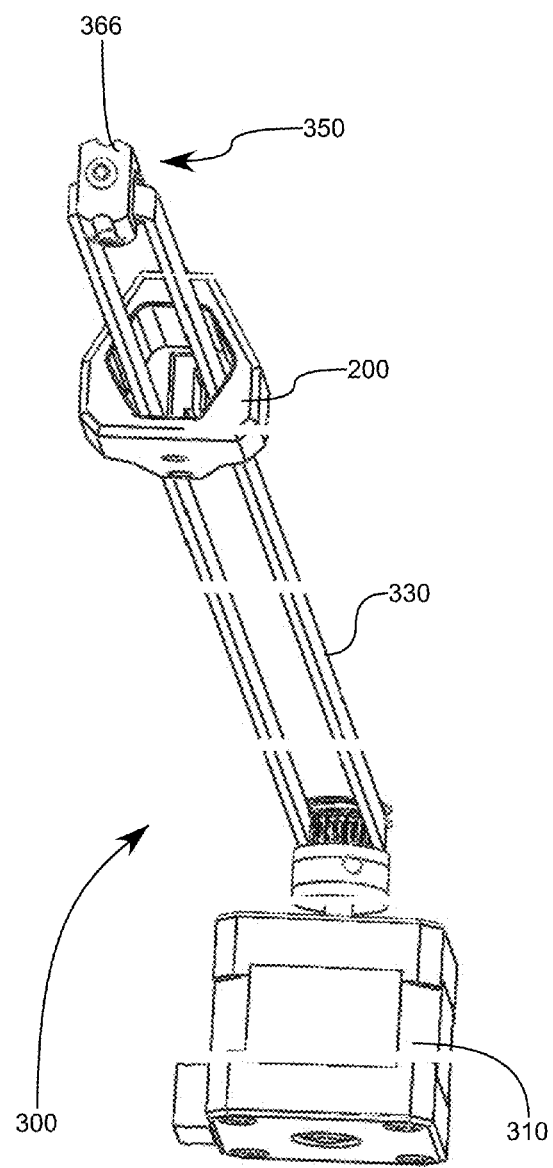
FIG. 10
FIG. 11

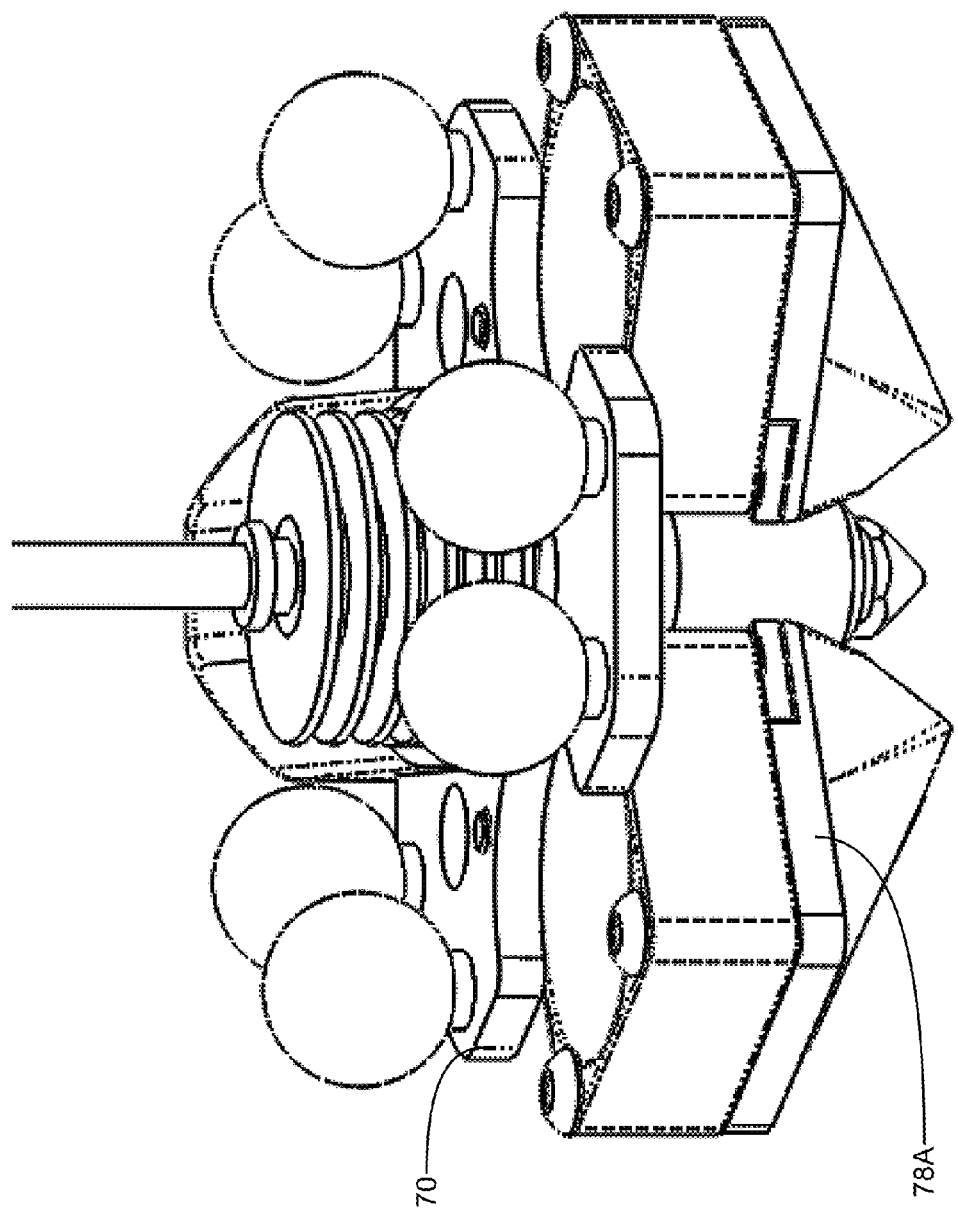

PARALLEL ARM FABRICATION APPARATUS AND SYSTEM FOR FACILITATING THREE DIMENSIONAL MOTION OF AN OBJECT

PRIORITY CLAIM

Priority is claimed to U.S. Provisional Patent Application Ser. No. 62/040,410, filed Aug. 21, 2014, which is hereby incorporated herein by reference in its entirety.

COPYRIGHT STATEMENT

A portion of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND

Field of the Invention and Related Art

The present invention relates generally to robotics, and more particularly to the use of a parallel arm robotic system commonly referred to as a delta robot. Delta robots are commonly characterized though their use of three guide rails which are spaced radially apart from each other about a central manipulation area. An object is suspended between the guide rails using a plurality of parallel arms and universal ball joints or similar linkage being attached to carriages which travel along each of the guide rails. Such robots have often been used in drawing applications, machining, etc. These systems often require a large number of moving parts and actuators which are constantly moving, and thus subject to failure due to the large number of moving parts. It will be appreciated, particularly in fabrication and machining, that debris from a work piece, machining fluids, or other contaminants can penetrate the moving parts and can cause premature failure of the exposed parts. Additionally, and particularly in the case of fabrication, machining, etc. precision of motion is always a concern, as such reduction or removal of rotation of the carriage about the guide rails, or increase of the precision of the relative axial translation of the carriage about the guide rails is a continuing endeavor. It will be appreciated, that each of the carriages will need to be in virtually constant motion along each of their respective guide rails so as to describe all but very limited types of motion of the item being suspended by the carriages, increasing the precision of this constant motion is also a continuing endeavor.

The present invention overcomes many of the deficiencies present in the delta style fabrication systems currently available. Some such advantages will be discussed in more detail below.

SUMMARY OF THE INVENTION

Contemplated herein is a fabrication apparatus and system for facilitating three dimensional motion of an object within the system, namely a delta style system for controlling the movement of a platform within a working area. The system includes a plurality of guide rails disposed about a perimeter of the working area, each guide rail further including an extended axial body having a rigid side wall and an outer surface; a hollow interior cavity; and a slot extending through the side wall, the slot being parallel to a main central axis of each guide rail. On each of the guide rails is provided at least one of a plurality of gliders. Each of the gliders can include an exterior portion configured to substantially encompass the guide rail about the outer surface thereof; and an interior portion residing within the hollow interior cavity of the guide rail. In order to facilitate the movement of the gliders about the rails a drive mechanism can be provided and configured to provide a driving force to each of the plurality of gliders to cause axial translation of each of the plurality of gliders along their respective guide rails, which driving force can be applied directly to the interior portion of each glider. The movable platform can then be suspended between a plurality of the gliders within the working area by a plurality of rods, which can be connected to the plurality of gliders using low friction ball joints or universal joints, wherein movement of the movable platform is effectuated by axial translation of one or more of the plurality of gliders along their respective guide rail.

In some embodiments the outer surface of each of the guide rails can be provided with at least one planar surface wherein the glider is keyed so as to have an interior cavity corresponding in shape to the outer surface of each of its corresponding guide rail.

In some embodiments the drive mechanism can include a drive member, i.e. a motor, which can be located about a first end of each of the plurality of guide rails, a tension member such as a belt or a chain can extend through the hollow interior cavity of the guide rail and be affixed to the interior portion of each respective glider. In such an embodiment a pulley assembly can be provided at a second end so as to provide bi-directional motion of the glider by reversing the drive direction of the tension member. This embodiment can further include a tension adjustment mechanism configured to move the pulley along the axial direction of each respective guide rail so as to provide a proper tension to the tension member.

In yet other embodiments each glider can be configured to apply a compressive force to the outer surface of its respective guide rail at radially spaced apart intervals so as to provide a local compressive deformation of the slot about each glider as the glider moves axially about its respective guide rail.

It will be appreciated that the movable platform can be configured to include various means of fabrication, including, but not limited to, a print nozzle configured to provide an additive material for additive material fabrication, alternatively the platform can constitute a print surface configured to receive an additive material for additive material fabrication, or alternatively the movable platform can include a machining tool such as a router or even move a specified material with respect to such a machining tool.

In yet additional embodiments, a method of fabricating an item, utilizing the above described device is contemplated, the method including various steps, including: providing a working area; providing a plurality of guide rails disposed about a perimeter portion of the work area, each guide rail comprising; providing a plurality of gliders, at least one glider corresponding to each of the guide rails, each glider comprising; providing a drive mechanism configured to provide a driving force to each of the plurality of gliders to cause axial translation of each of the plurality of gliders along their respective guide rails; and providing a movable platform suspended between a plurality of the gliders by a plurality of rods, at least one rod corresponding to each glider, movement of the movable platform being effectuated by axial translation of one or more of the plurality of gliders along their respective guide rail; providing a fabrication mechanism on the movable platform; and translating the plurality of gliders along their respective guide rails so as to effectuate motion of the fabrication mechanism in a predetermined movement path so as to effectuate fabrication of an item.

The method can further include various other optional steps including: applying the driving force of the drive mechanism from within the guide rail directly to the interior portion of each glider; applying a compressive force from each glider to the outer surface of each respective guide rail at radially spaced apart intervals so as to provide a local compressive deformation of the slot about each glider; or providing one or more bearings between the outer surface of each guide rail and each associated glider.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 7 illustrates an end view of one of the guide rails having a drive mechanism and tension adjuster for use within the parallel arm fabrication apparatus and system for facilitating three dimensional motion of FIGS. 1-3;

FIG. 8 illustrates an end view of one of the guide rails having a pulley system and tension adjuster for use within the parallel arm fabrication apparatus and system for facilitating three dimensional motion of FIGS. 1-3;

FIG. 10 illustrates a perspective views of a drive assembly configured to effectuate axial motion of the glider along the guide rail having a portion of a top support structure;

FIG. 11 illustrates a perspective views of the drive assembly of FIG. 10, having the portion of the top support removed so as to illustrate an internal tension adjustment mechanism;

FIGS. 24A-C illustrate perspective views of various fabrication heads configured for use in the parallel arm fabrication apparatus and system for facilitating three dimensional motion of FIGS. 1-3;

Figure 1:
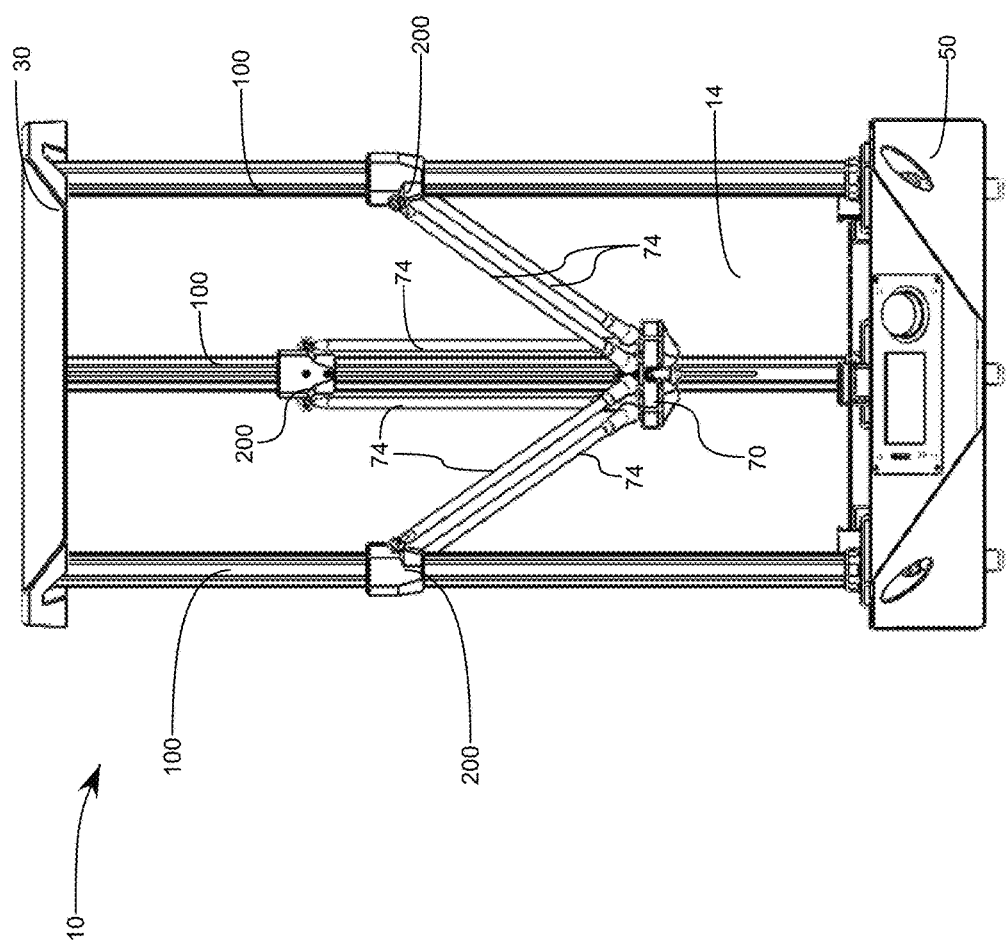
FIG. 1 illustrates a front view of a parallel arm fabrication apparatus and system for facilitating three dimensional motion of an object in accordance with various aspects of the present invention.
Figure 2:
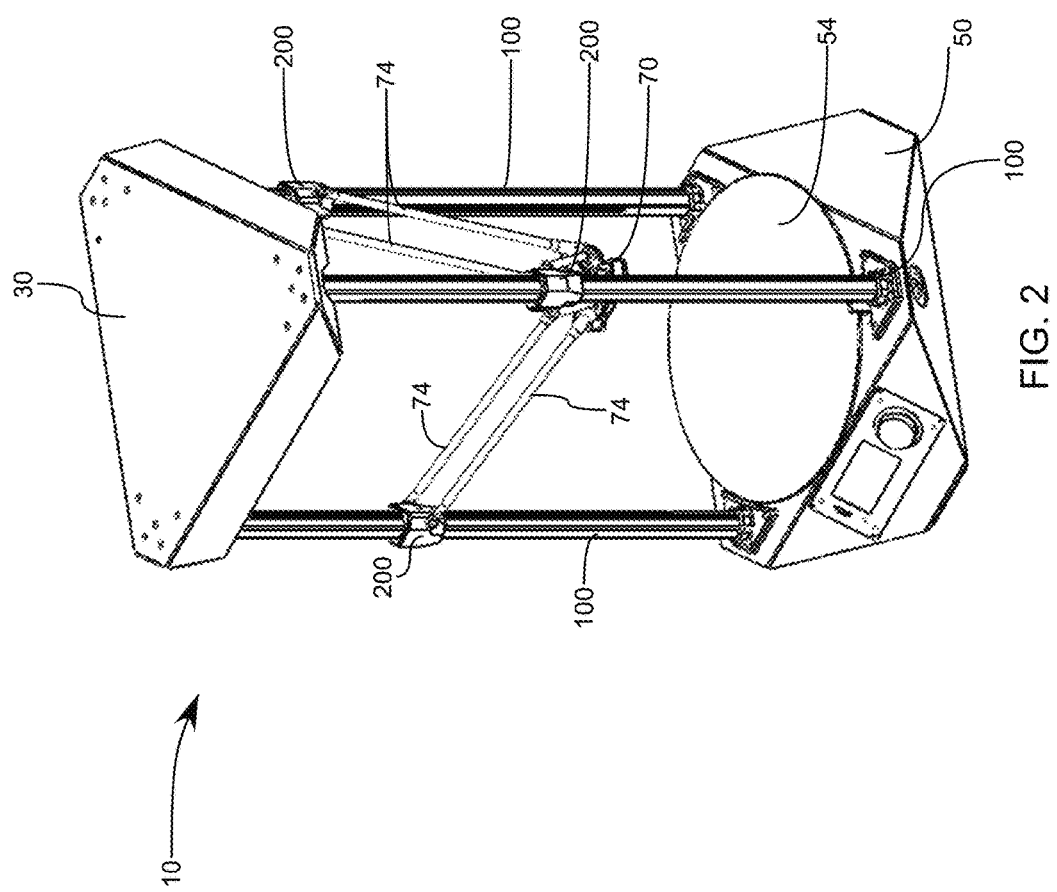
FIG. 2 illustrates a perspective view of a parallel arm fabrication apparatus and system for facilitating three dimensional motion of an object in accordance with various aspects of the present invention.
Figure 3:
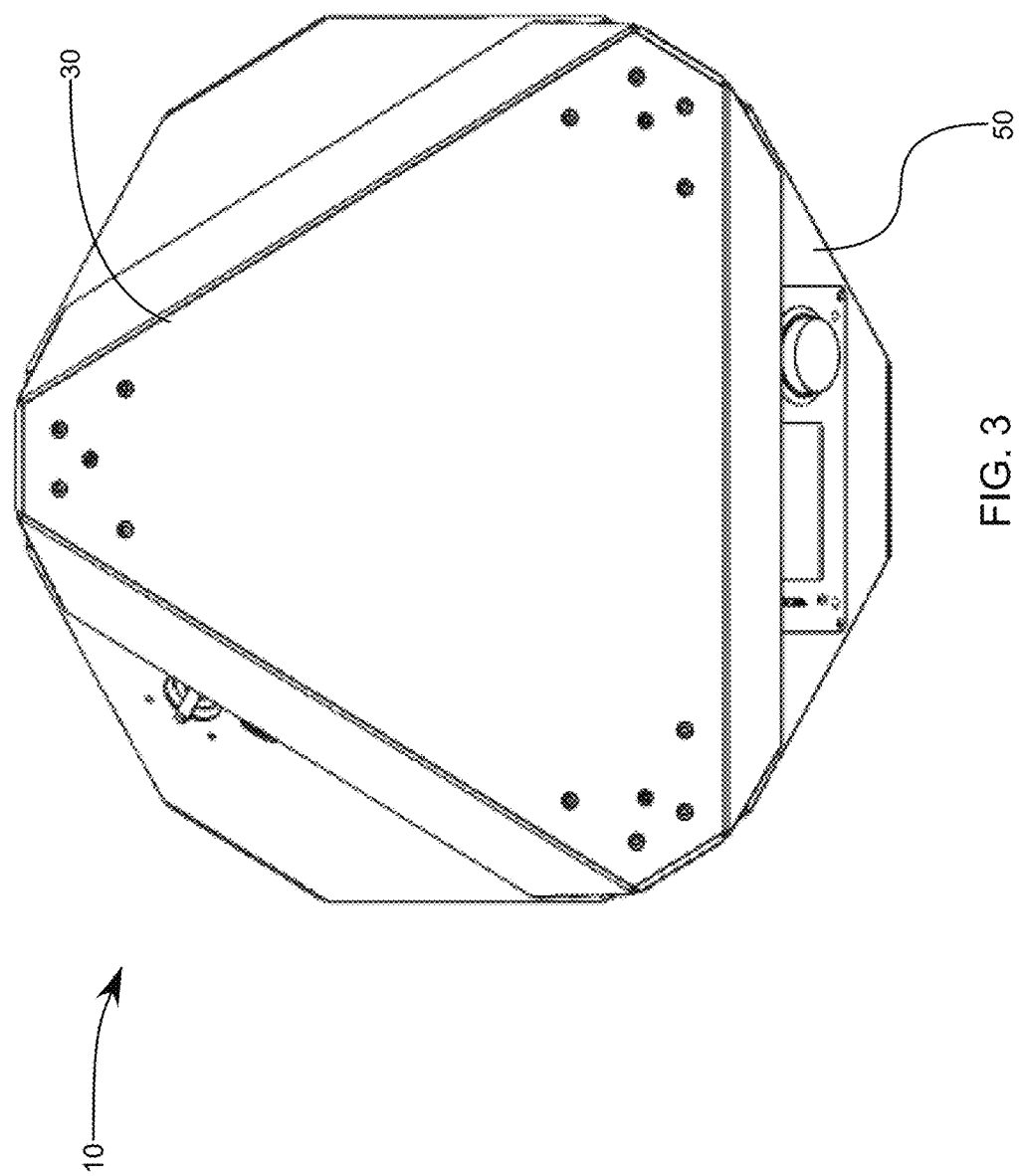
FIG. 3 illustrates a top view of a parallel arm fabrication apparatus and system for facilitating three dimensional motion of an object in accordance with various aspects of the present invention.
Figure 4:
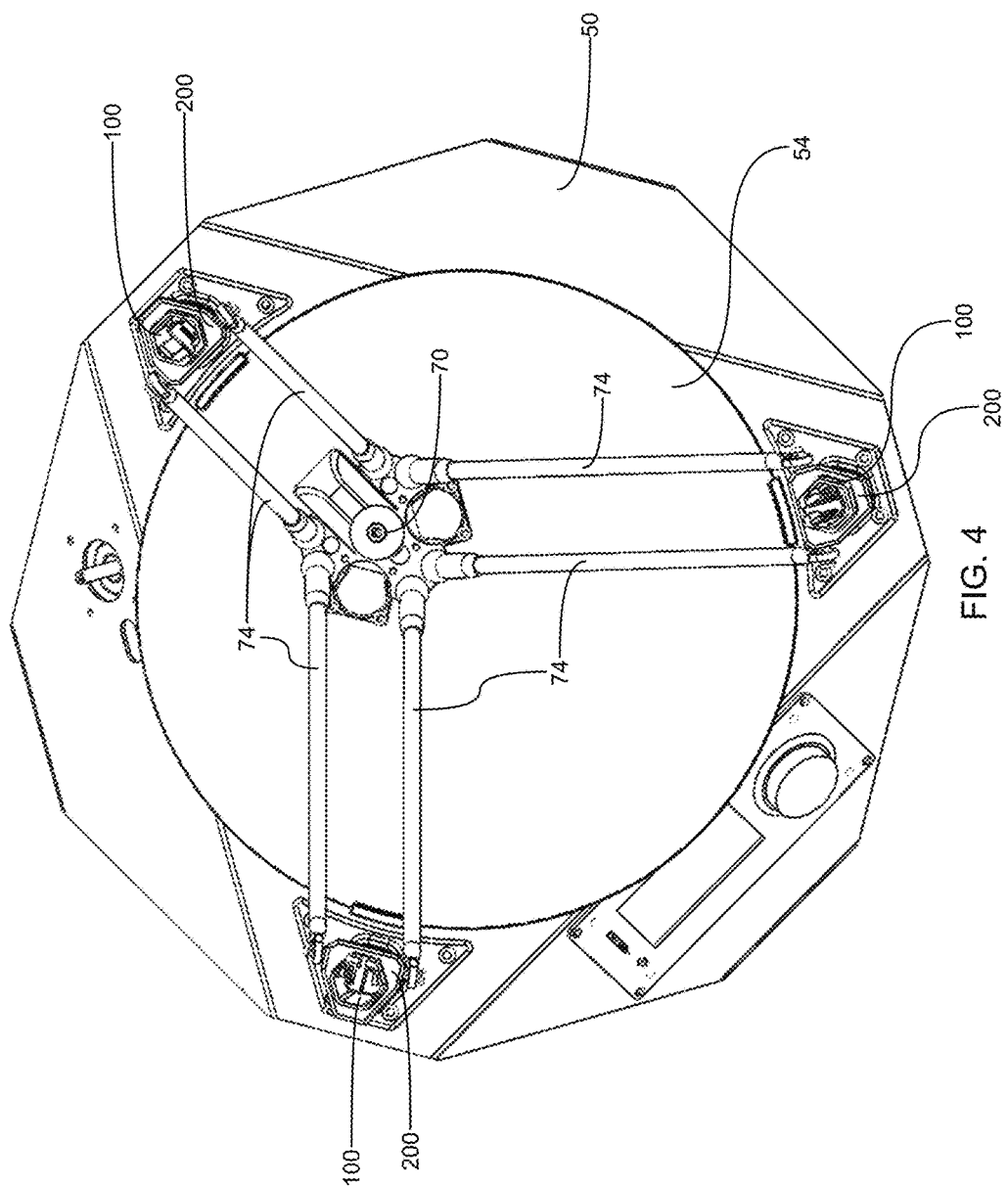
FIG. 4 illustrates a top view of a suspended object within the parallel arm fabrication apparatus and system for facilitating three dimensional motion of FIGS. 1-3.

Reference will now be made to the exemplary embodiments illustrated, and specific language will be used herein to describe the same. It will nevertheless be understood that no limitation of the scope of the invention is thereby intended though the exemplary embodiments discussed, but the examples are for purposes of illustration of the inventive concepts.

DETAILED DESCRIPTION OF EXAMPLE EMBODIMENT(S)

FIGS. 1-4, illustrate an exemplary embodiment of a parallel arm fabrication apparatus and system for facilitating three dimensional motion of an object 10. The apparatus 10 can include an upper support portion 30, a base support portion 50 and a plurality of guide rails 100 disposed about a perimeter thereof. The area defined within the upper support portion 30, the base support portion 50 and the plurality of guide rails 100 will be referred to herein as a working area 14. The working area can have a fabrication platform 54 provided therein as well as a movable platform 70 suspended over the fabrication platform 54 from the plurality of guide rails 100. The movable platform 70 can be suspended from the plurality of guide rails 100 using a combination of rods 74 arranged as a set of parallel arms which are rotationally coupled to both the platform and a series of gliders 200 supported about their respective guide rails 100. The rods 70 can be coupled to both the platform 70 and their respective gliders 200 using ball joints, bushings, or any other low rotational friction style joint. It will be further appreciated that parallel rods, i.e. at least 2 rods per glider provides a certain degree of rotational rigidity and precision of movement of the platform 70 within the working area 14.

It will be appreciated that in some instances rods 74 being formed of rigid posts as depicted will be preferable as the rods allow for the platform to be both pulled and pushed by each respective glider 200, however in some applications the rods can be provided as tension only members such as chain, string, or rope, such that the gliders can only pull the platform 70 or allow the platform to fall in an arc as defined by the tension in the other tension only members.

Regardless of whether rods 74 or tension only members are used, the platform 70 can then be moved in virtually any path within the three dimensional space defined by the working area 14 by moving each of the gliders 200 axially along their respective guide rail 100.

Figure 5B:
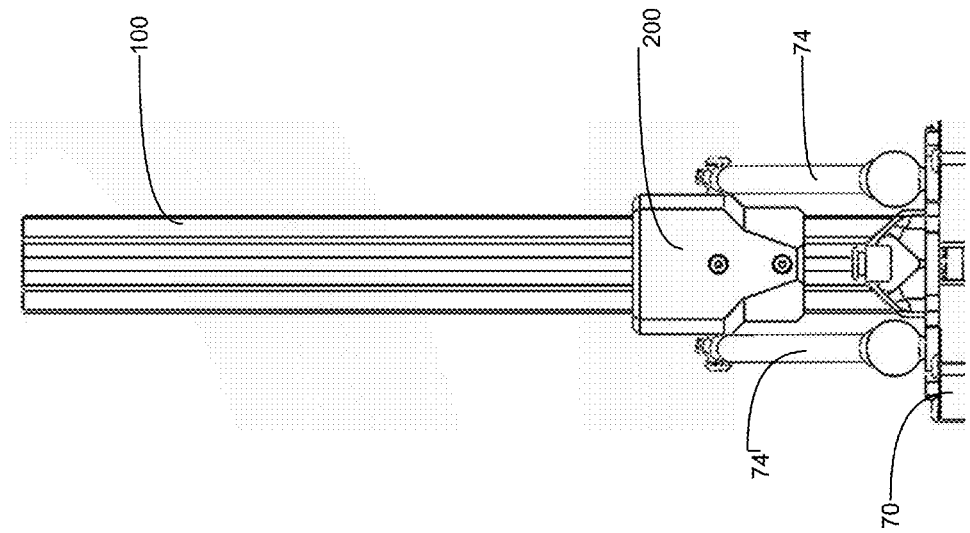
FIGS. 5A-B illustrates a front view of a glider on one of the guide rails of a suspended object within the parallel arm fabrication apparatus and system for facilitating three dimensional motion of FIGS. 1-3, the glider being shown at different axial heights along the guide rail.
Figure 5A:
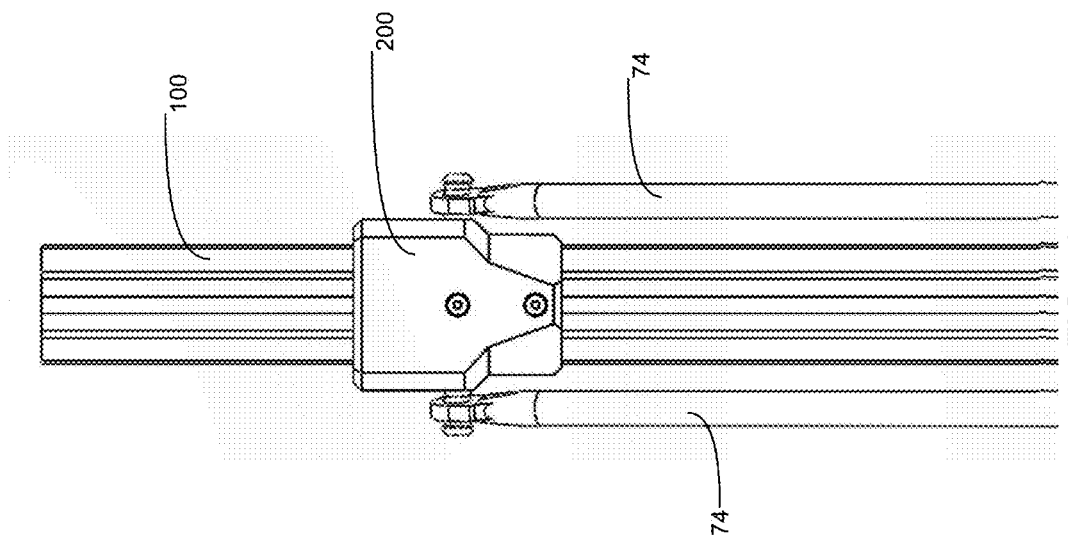
Figure 6:
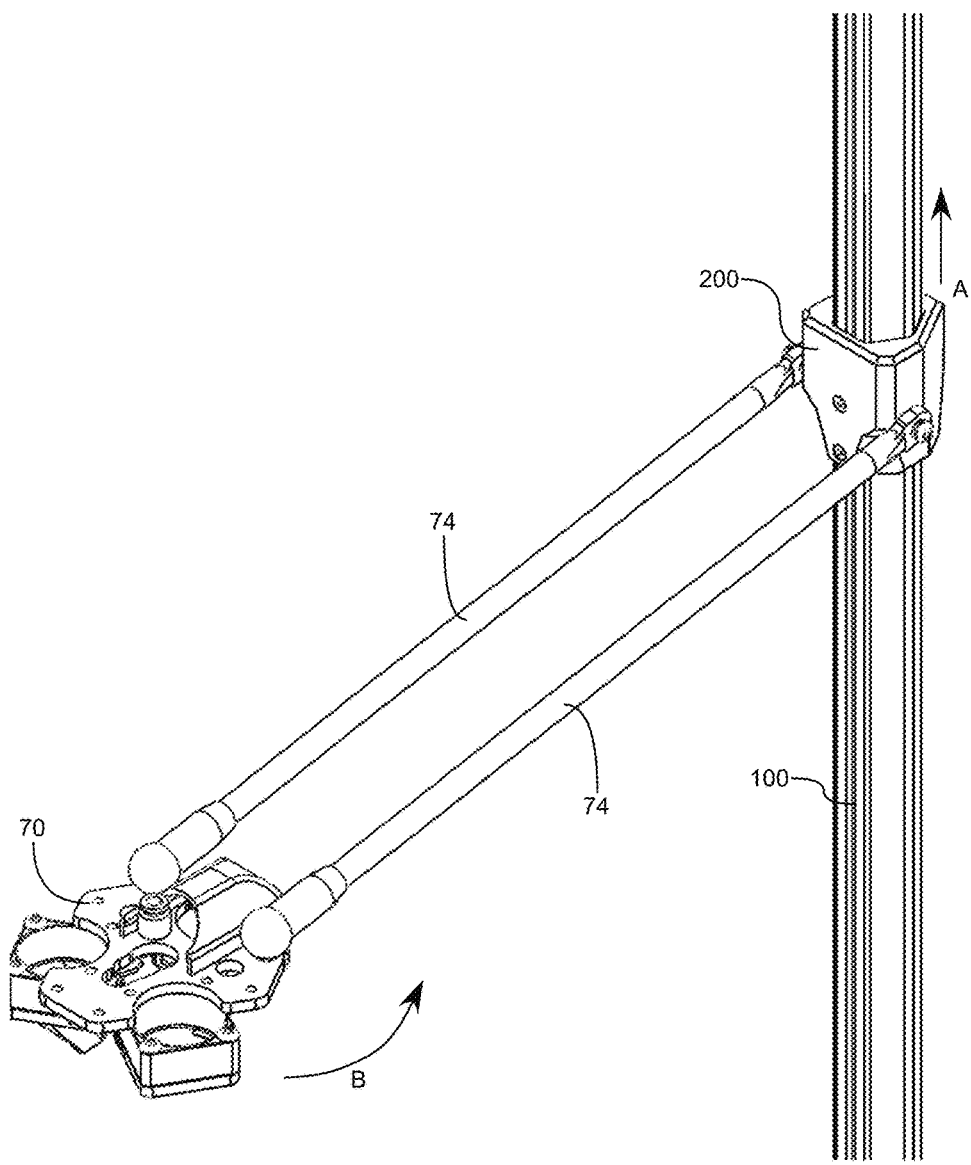
FIG. 6 illustrates a perspective view of a glider, parallel arms, and movable object of one of the guide rails within the parallel arm fabrication apparatus and system for facilitating three dimensional motion of FIGS. 1-3.

FIGS. 5A-B and 6 illustrate a more detailed view of an individual glider 200 on a corresponding guide rail 100. The relative changes in axial height of the gliders 200 will understandably have an effect on the relative angular position of the rods 74 with respect to both the gliders 200 and the movable platform 70. With regard to FIG. 6 assuming that platform is actually connected at three points, not shown, an upward translation A, as shown by the arrow about the guide rail 100, will result in an arcuate motion B of the platform 70, as shown by the arrow about the platform 70.

Figure 9:
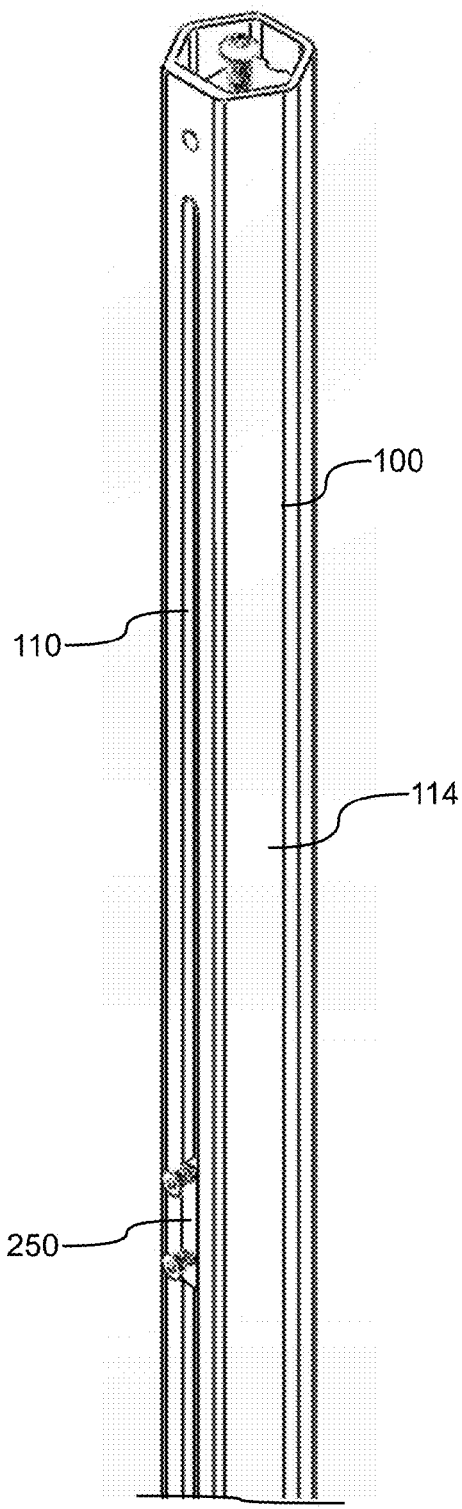
FIG. 9 illustrates a perspective view of one of the guide rails having an internal tension adjuster for use within the parallel arm fabrication apparatus and system for facilitating three dimensional motion of FIGS. 1-3.
Figure 12:
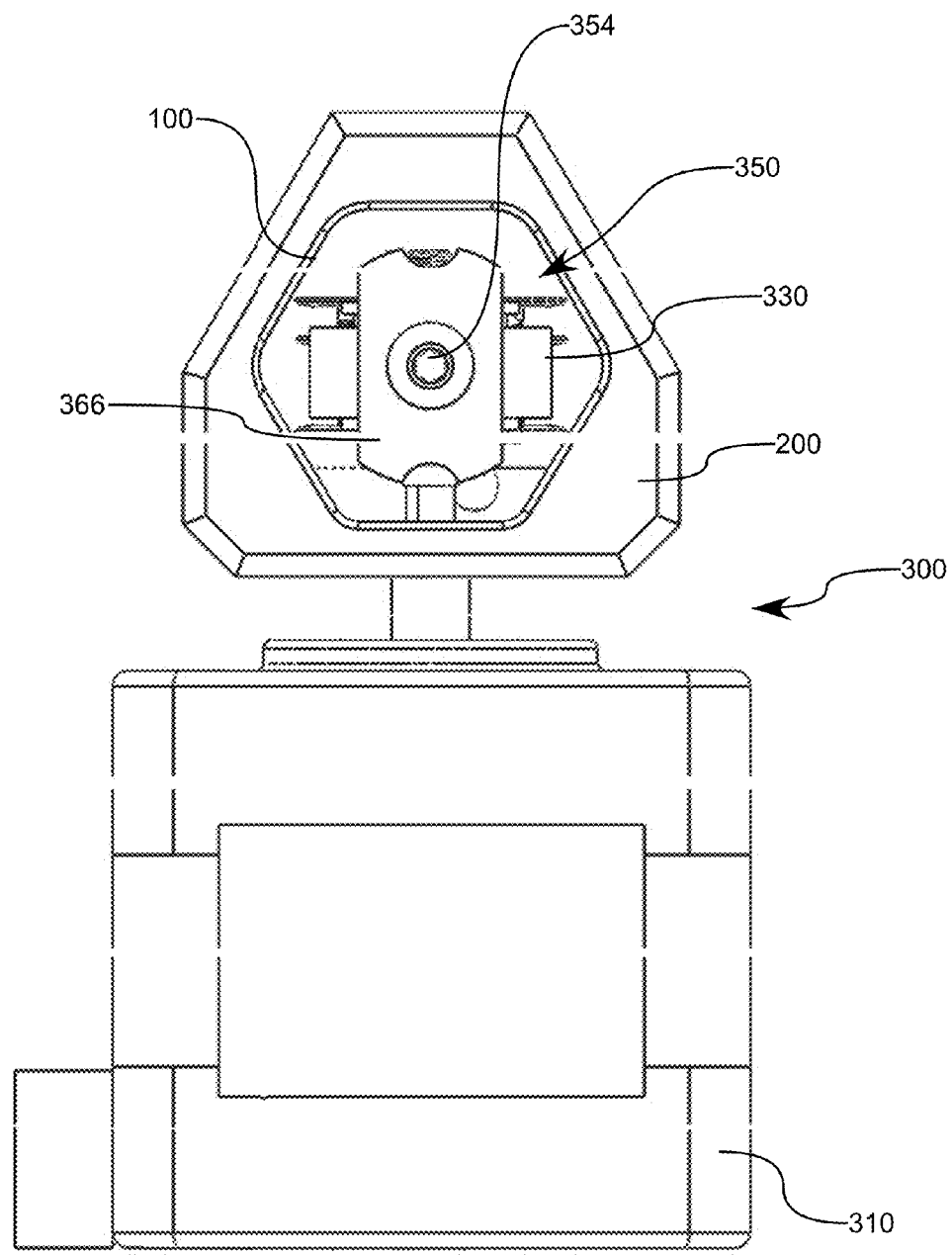
FIG. 12 illustrates a top view of an entire rail assembly for use within the parallel arm fabrication apparatus and system for facilitating three dimensional motion of FIGS. 1-3.

FIG. 9 illustrates various features of each of the guide rails 100. In this embodiment the guide rail 100 is provided as an extended body with a hollow space defined by a relatively thin or annular sidewall extending along the central axis thereof. A slot 110 can then be provided through the sidewall so as to provide a channel which allows for connection of an exterior portion, not shown here, of each glider 200 to an interior portion 250. Movement of the gliders can then be effectuated by providing a driving force to the interior portion of each glider 200 within the hollow cavity. FIG. 9 also illustrates how the guide rails can be provided with at least one planar exterior surface 114 for interfacing with each glider 200, as will be discussed in more detail below.

Figure 13:
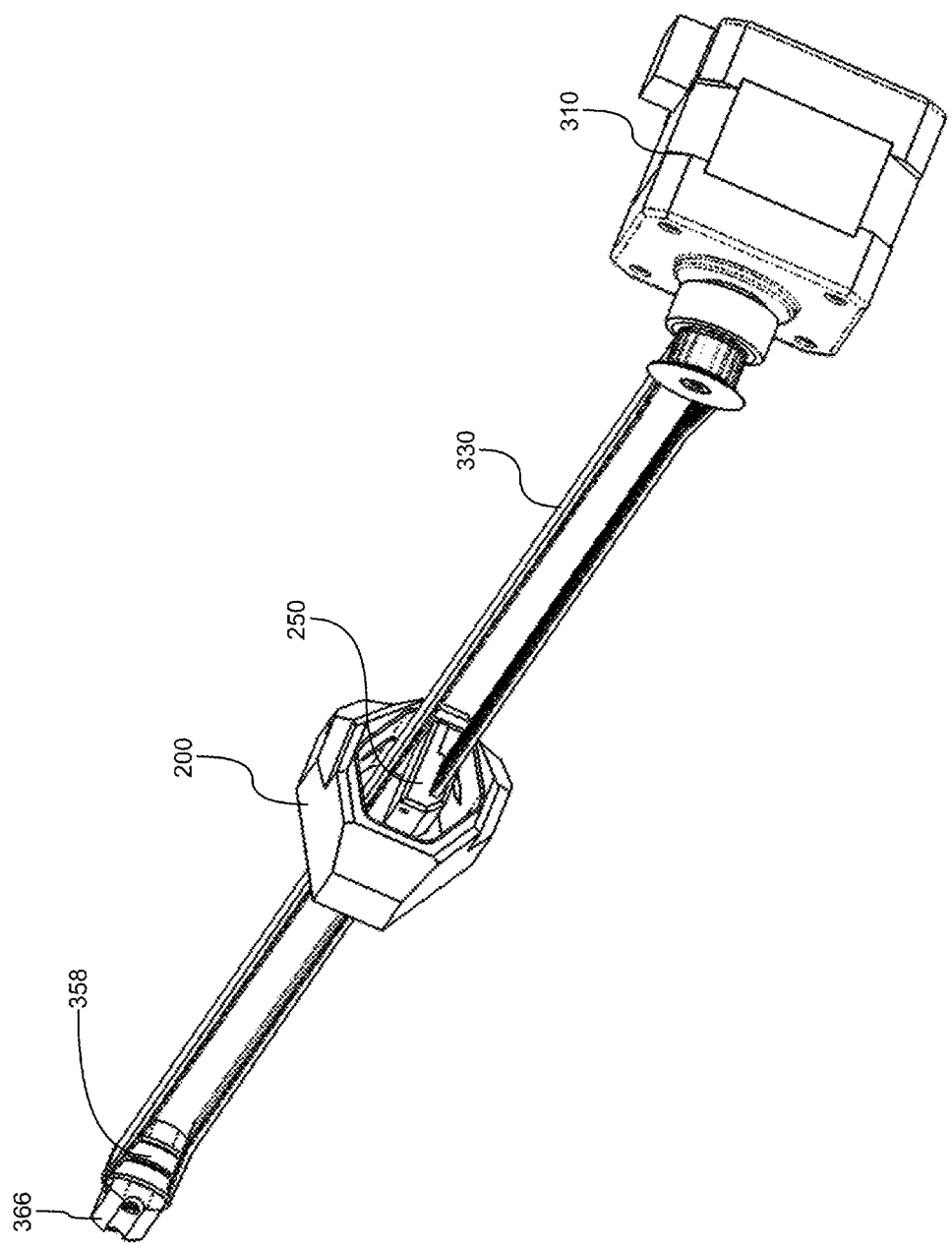
FIG. 13 illustrates a perspective view of an glider and drive assembly for use within one of the guide rails within the parallel arm fabrication apparatus and system for facilitating three dimensional motion of FIGS. 1-3.
Figure 14:
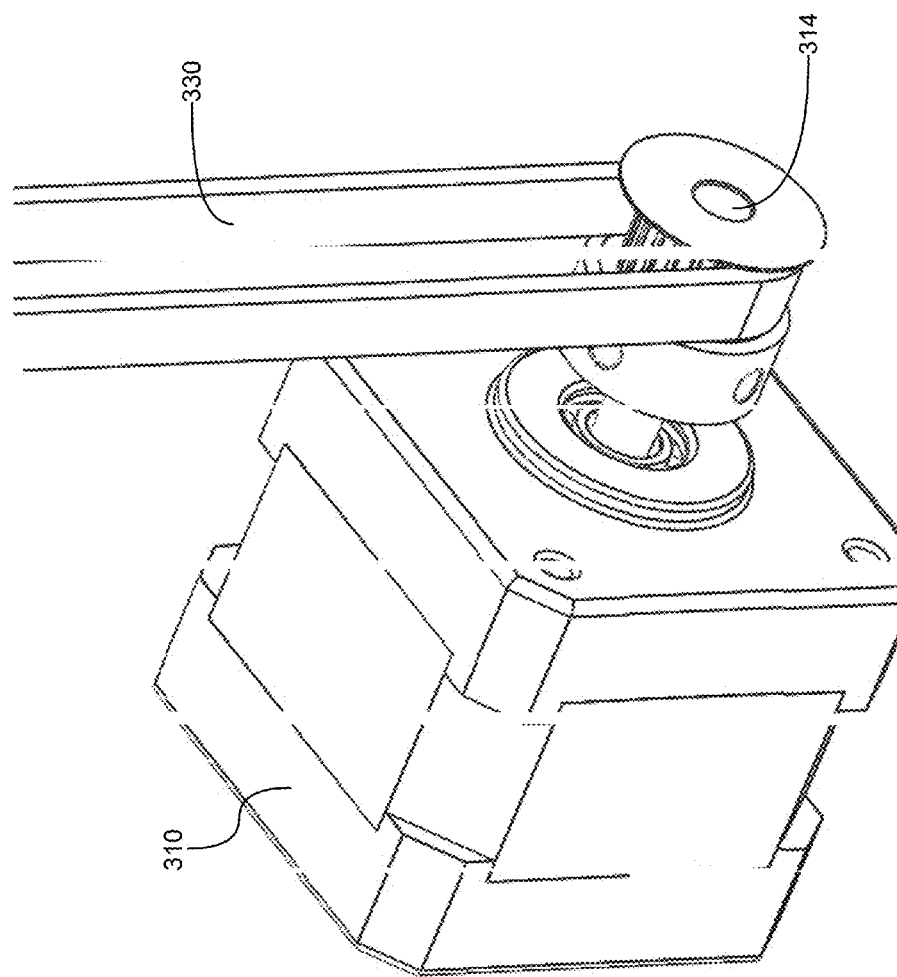
FIG. 14 illustrates a perspective view of a drive mechanism and tension member for use within one of the guide rails within the parallel arm fabrication apparatus and system for facilitating three dimensional motion of FIGS. 1-3.
Figures 15A, 15B:
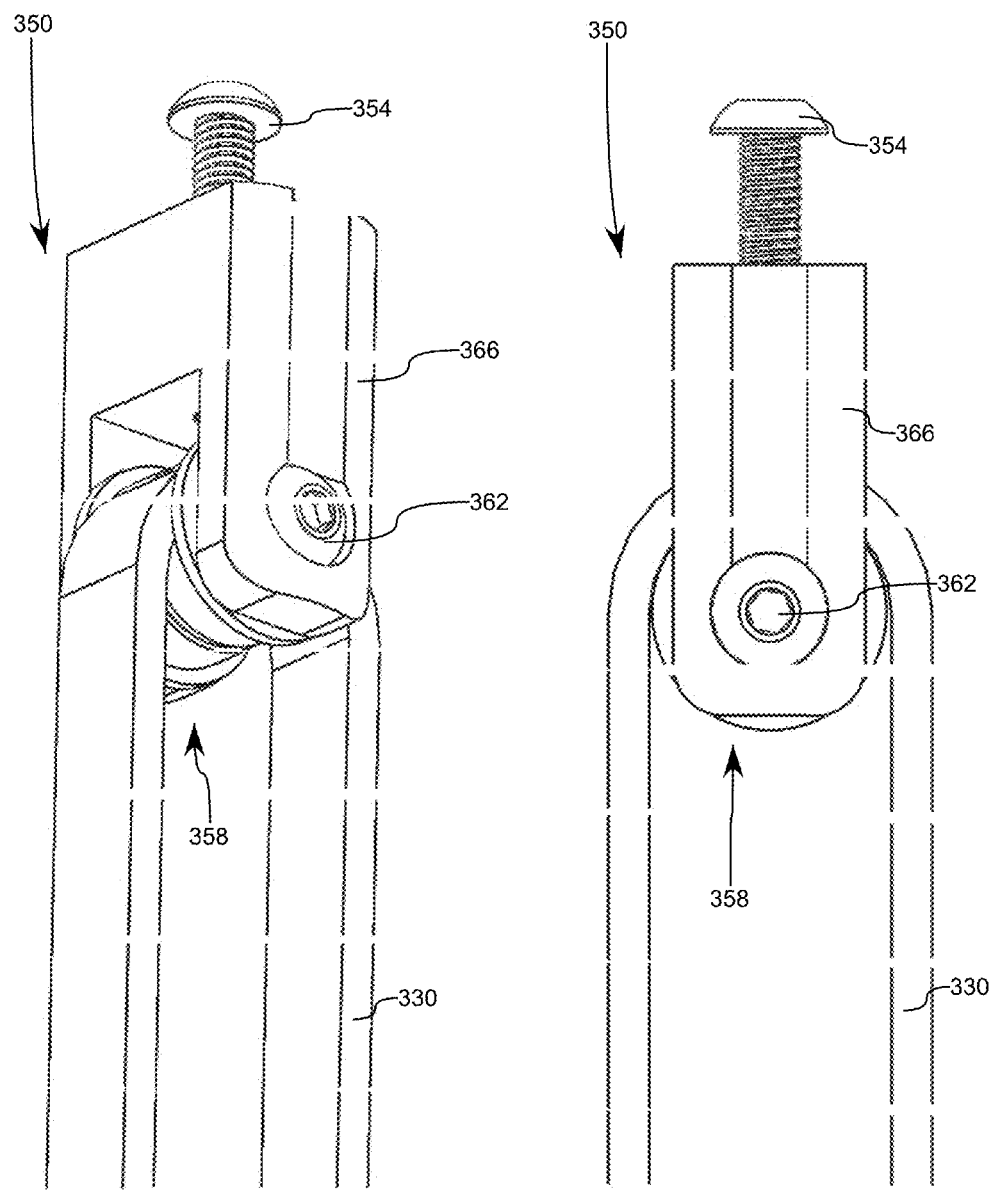
FIGS. 15A-B illustrate perspective, and front, views of a pulley system and tension member for use within one of the guide rails within the parallel arm fabrication apparatus and system for facilitating three dimensional motion of FIGS. 1-3.
Figure 16:
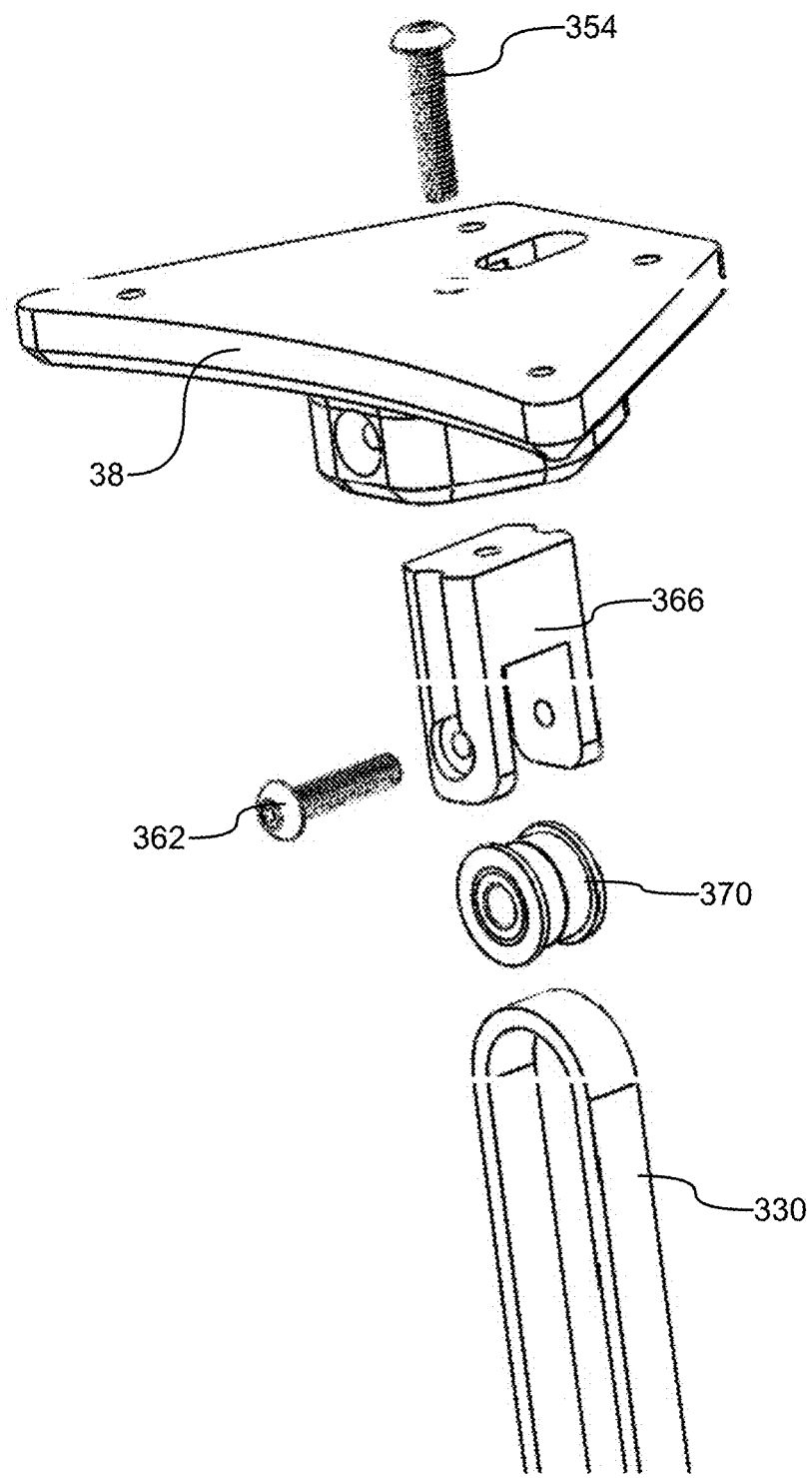
FIG. 16 illustrates a perspective exploded view of a pulley tensioning system for use with the pulley system of FIGS. 15A-B.
Figure 17:
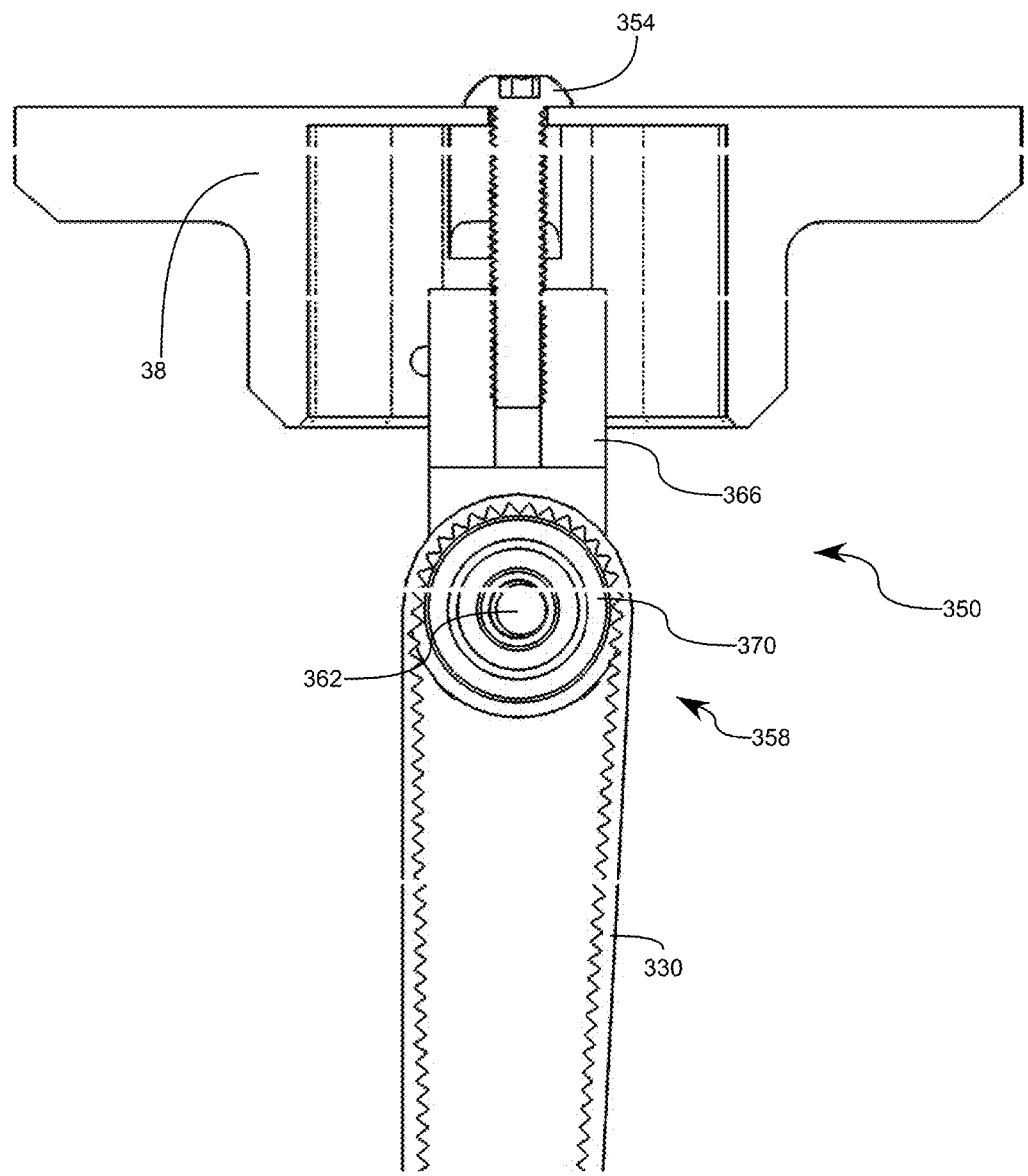
FIG. 17 illustrates a cross sectional view of the pulley tensioning system of FIG. 16.
Figure 18:
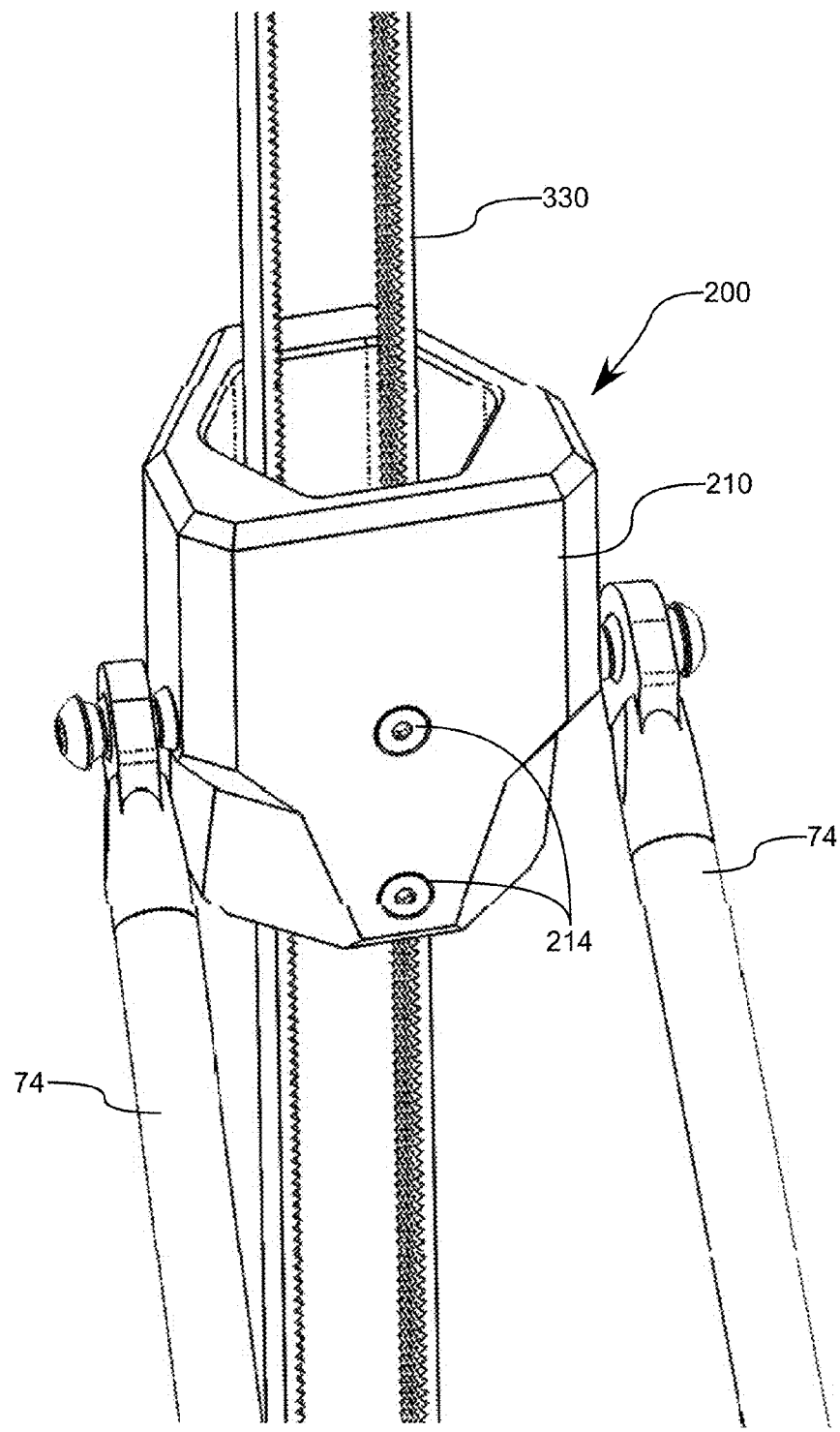
FIG. 18 illustrates a perspective view of a glider for use within the parallel arm fabrication apparatus and system for facilitating three dimensional motion of FIGS. 1-3.
Figure 19:
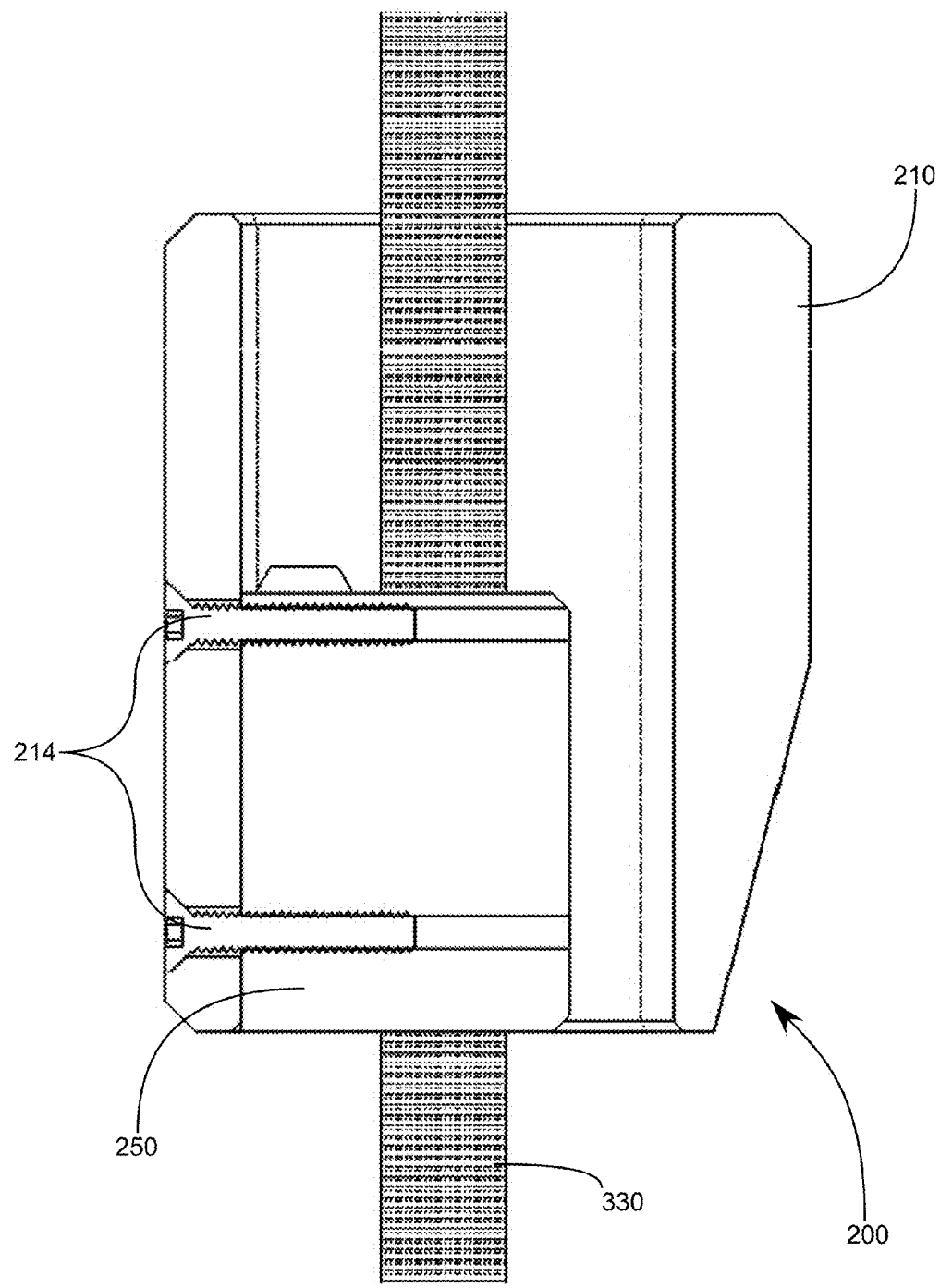
Figure 20:
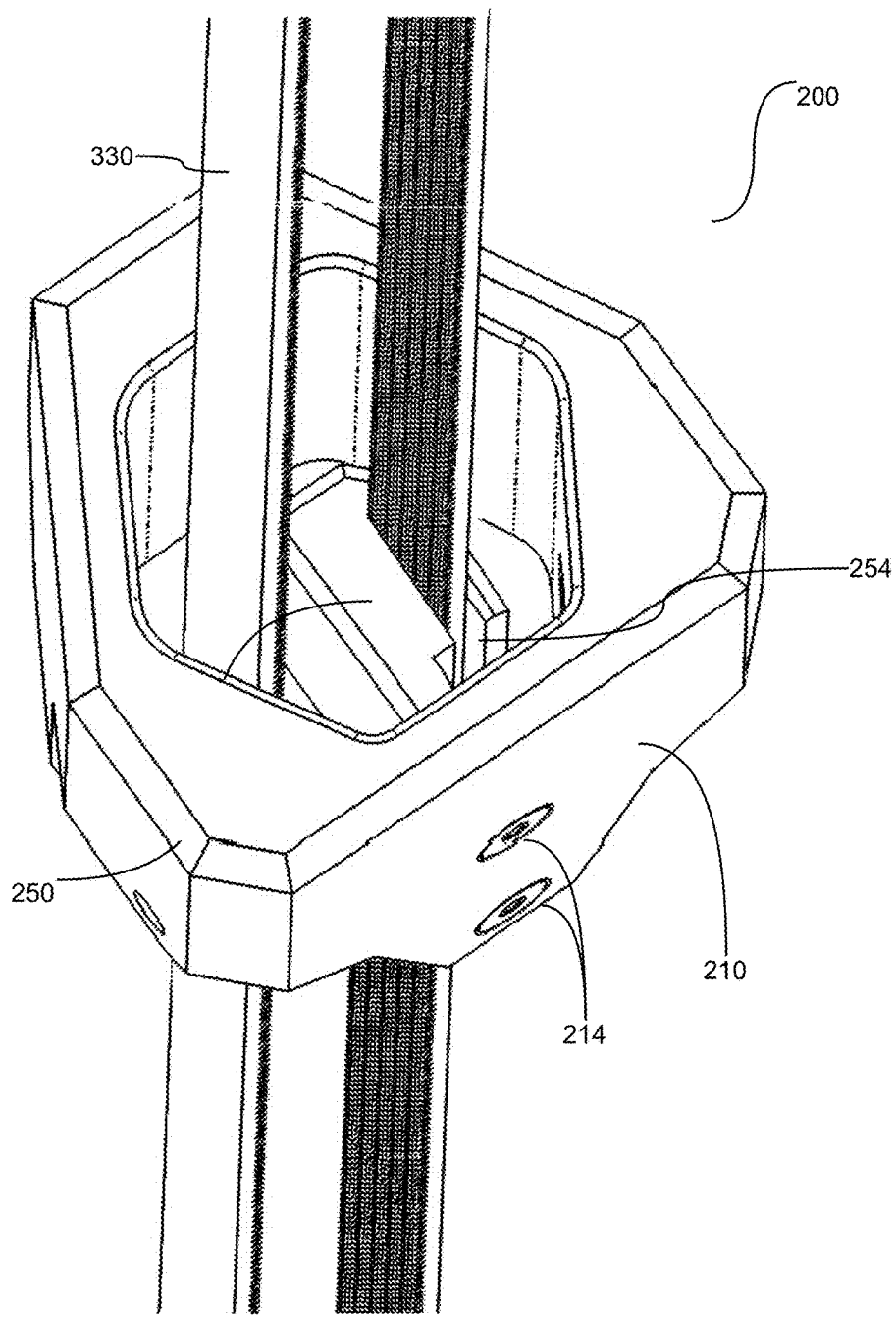
FIG. 20 illustrates a top perspective view of the glider of FIG. 18.
Figure 21:
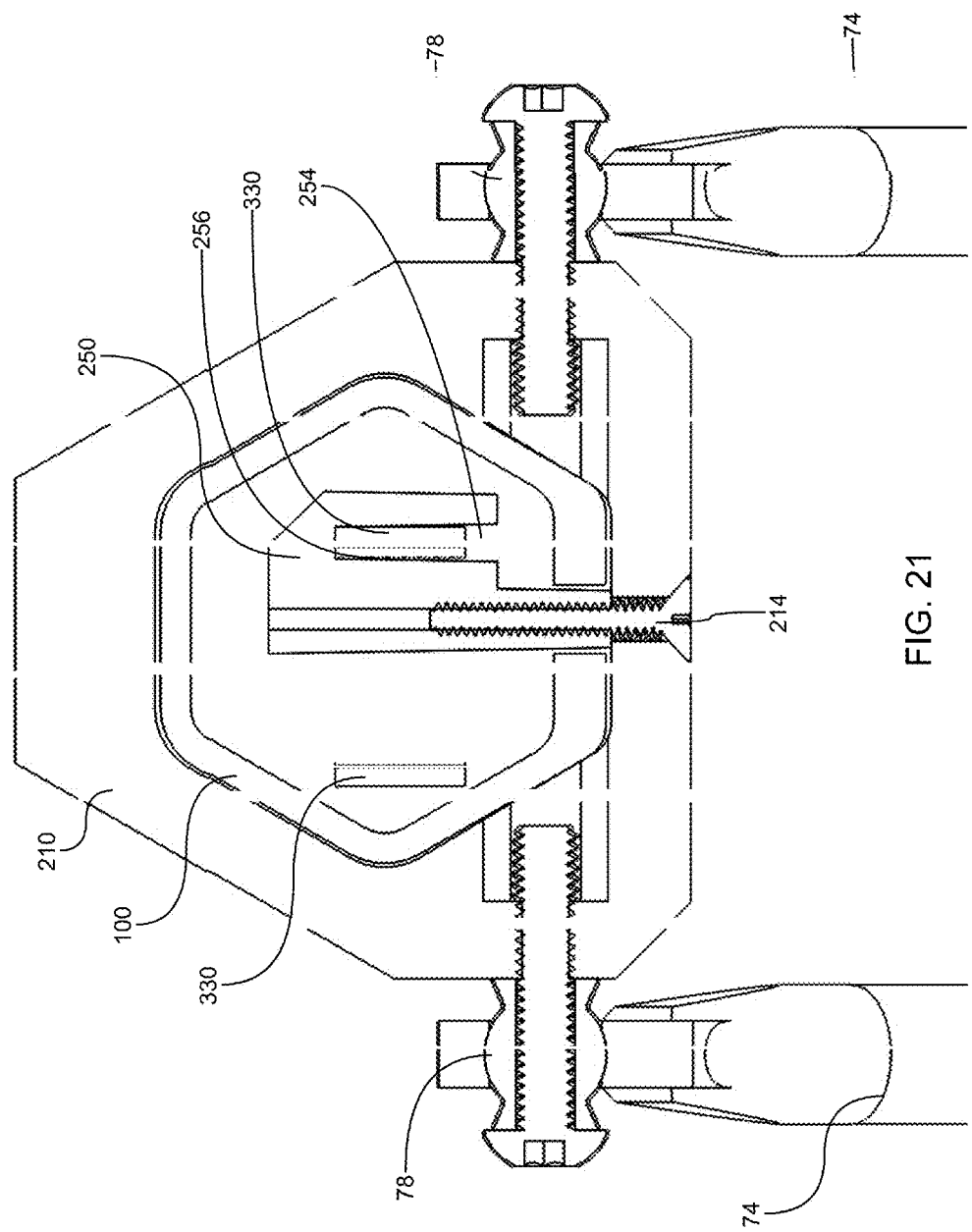
FIG. 21 illustrates a top cross sectional view of the glider of FIG. 18.
Figure 22:
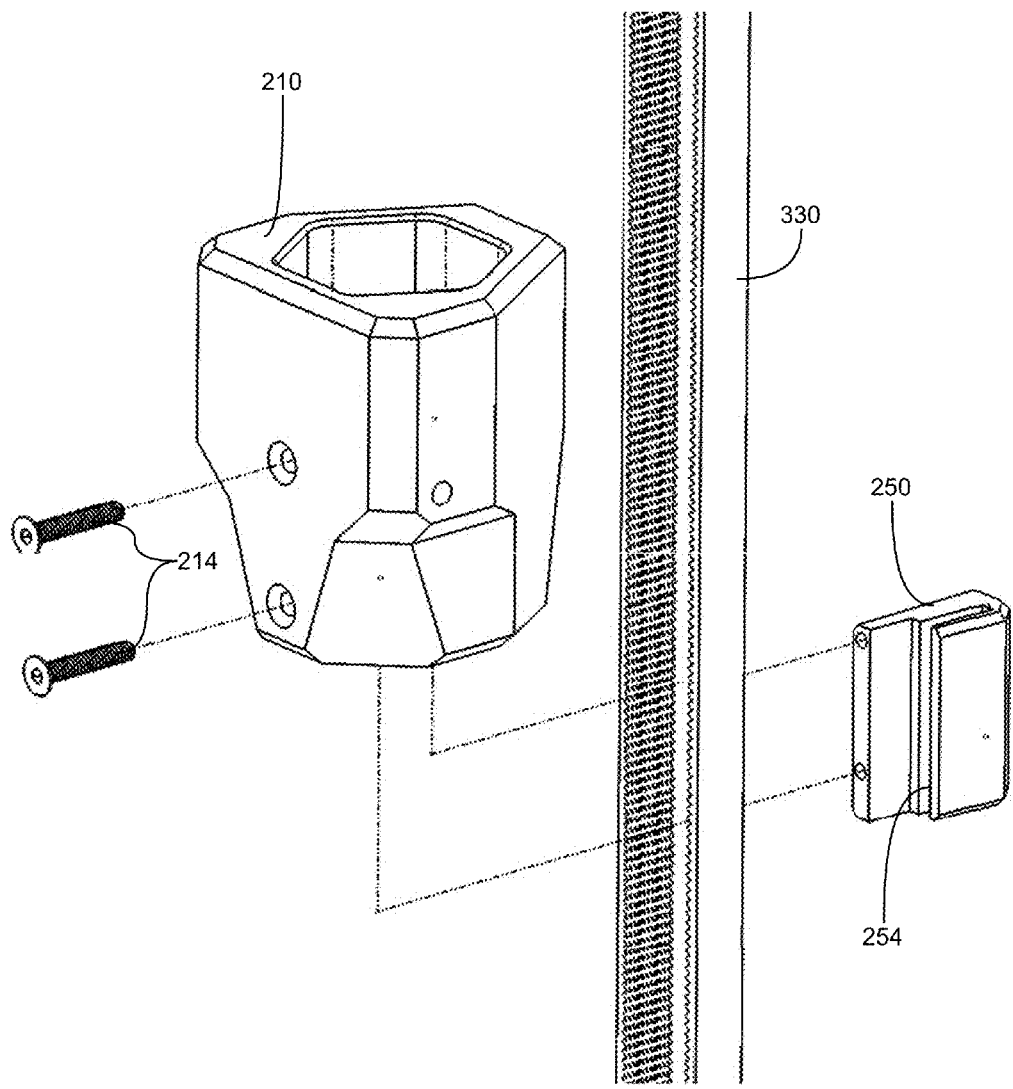
FIG. 22 illustrates an exploded view of the glider and belt of FIG. 18.

FIGS. 7-8, and FIGS. 1-014 illustrate various views of a drive mechanism 300 for facilitating movement of a glider 200 about a respective guide rail 100. The interior cavity of each guide rail 100 provides a protected area through which a drive force can be applied to the glider 200. In the embodiment shown, a tension member 330, i.e. a belt can be attached to the interior portion 250 (See FIGS. 13 and 22) of the glider 200. The interior portion of the glider can connect through the slot 110 to the exterior portion 210 of the glider 200 which provides a keyed interface between the glider 200 and the guide rail 100, wherein keyed indicates that an inner surface of the glider corresponds to the shape of the outer surface of the guide rail. The keyed interface between the glider 200 and the guide rail 100 can be provided by providing a plurality of planar or contoured surfaces, all being angled with respect to adjacent surfaces, which correspond in shape to an interior surface of the outer portion of the glider. This keyed interface can assist in properly locating each glider about its particular guide rail, or in other words prevent the glider from twisting about its respective guide rail 100 and thus provide better precision of movement of the glider 200 about its respective guide rail or shaft 100. In some alternative embodiments it will be appreciated that the connection between the exterior portion 210 and the interior portion 250 of each glider can prevent twisting or otherwise locate each glider by causing the connection between the outer portion and the inner portion of each glider to ride on the walls of the slot through which it passes, thus providing another degree of location, or in other words providing another point about the interface between the glider and its respective guide rail which prevents radial twisting of the glider 200 about the guide rail even in a circular, or un-keyed, configuration. However it will be appreciated that by increasing the number of interface points, which resist rotation, the strength and reliability of resisting the radial twisting will be increased.

The axial motion of the glider 200 about the guide rail 100 can be effectuated using a plurality of means. In the embodiment shown, the axial translation of the glider 200 about the guide rail 100 is effectuated using a tension member, i.e. a belt 300. The belt can be affixed to the interior portion 250 of the glider on one point about the belt loop, thus creating a drive side of the belt within the guide rail 100 and a return side. A motor/member 310 and drive shaft 310 can be provided at a first end, and a pulley assembly 358 can be provided at a second end with the tension member 330 spanning the distance of the guide rail 100. In this manner driving the belt in a first direction can cause an upward translation of the glider 200 along the axial length of the guide rail 100, while a reverse second direction can pull the glider 200 and cause a downward translation of the glider 200 along the axial length of the guide rail 100.

FIGS. 10-13 and 15-17 illustrate a tension adjustment mechanism which utilizes a tension adjustment screw to change the axial location of a pulley support body 366 within the guide rail, not shown, the pulley support body 366 can have the pulley wheel 370 and pulley shaft 362 being supported thereby so as to provide free motion of the belt or chain 330 at the end opposite the drive motor/member 310. The guide rail can be anchored into an upper support adapter 38 which can then be affixed to the upper support portion of the fabrication apparatus.

A tension adjustment screw 254 can then be provided which rests on an upper surface of the upper support adapter 38, wherein the threaded portion of the adjustment screw 254 extends into a threaded portion of the pulley support body 366. In this manner the pulley support body 366 can be caused to translate along the axial length of the guide rail by tightening or loosening the tension adjustment screw 254 so as to facilitate proper tension of the tension member/belt 330.

FIGS. 18-22 illustrate various aspects of the glider 200. The glider 200 can have both the exterior portion 210 and the interior portion 250 formed as a unitary or single piece, or alternatively, the exterior and interior portions can be formed separately and bolted together as shown in the present embodiment using a plurality of glider bolts 214 which attach the exterior portion 210 to the interior portion 250 so as to better facilitate assembly. Each of the gliders 200 can be provided with an arm attachment means 78 such as a ball joint or other rotational connections so as to provide the necessary degrees of freedom to allow the rods 74 to rotate with respect to the gliders 200 as they move axially along the guide rails, not shown.

The tension member 330 can be attached via numerous means to the interior portion 250. The present embodiment illustrates how the interior portion 250 can be provided with a slot 210 into which the belt 330 can be threaded and affixed so as to provide a secure connection. The slot can act as a clamp and be bolted down so as to provide a clamp/friction fit, or the belt can be provided with a bracket which screws onto the interior portion or alternatively, and as illustrated, the slot 254 can function as a vessel into which an adhesive 256 can be introduced and cured so as to hold the interior portion 250 securely to the belt 330 and prevent slipping of the belt 330 through the slot 254.

Figure 23:
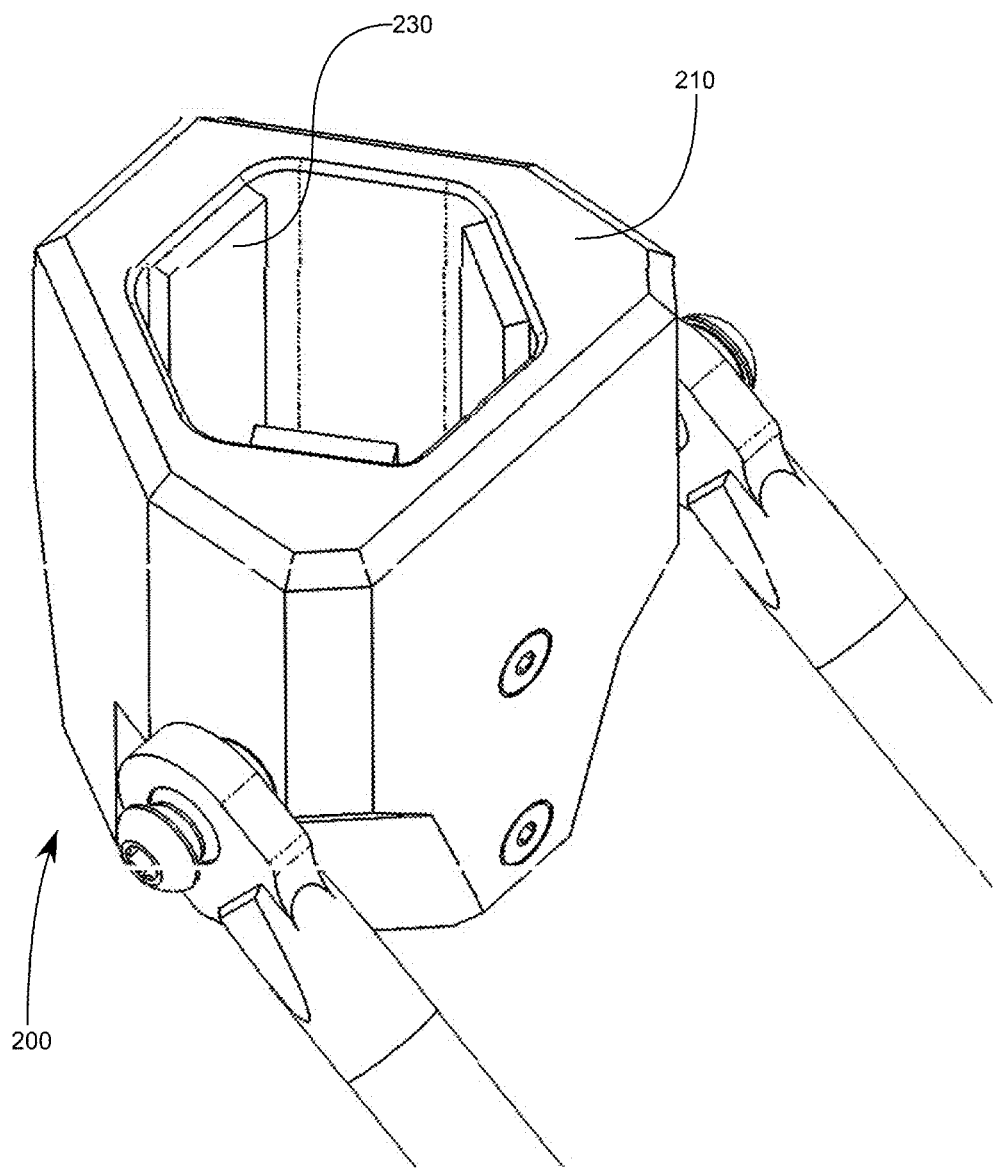
FIG. 23 illustrates a perspective view of a glider utilizing a friction reduction means for facilitating axial translation.

FIG. 23 illustrates a glider assembly 200 which is further provided with a series of low friction strips 230 provided on the inner facets of the exterior portion 210. The low friction strips can be provided as a low friction polymer such as polyurethane so as to facilitate easy sliding of the glider 200 along its respective guide rail, not shown. It will be appreciated that similar low friction strips can also be provided on the exterior surfaces of the guide rails so as to facilitate free motion of the gliders 200 along their respective guide rails. Alternative friction reduction can be achieved by providing ball or roller bearings between the gliders and their respective guide rails wherein the bearings would be of most use embedded within the interior surfaces of the gliders. Screw mechanisms could then be provided to adjust the contact pressure and alignment of the bearings onto the guide rail surfaces for fine tuning.

In some embodiments the gliders can be slightly undersized with respect to their respective guide rails wherein a press fit with an associated compression of the guide rails would be required for assembly. In such an embodiment the slot could be configured to provide the necessary tolerance wherein the slot would compress and have an appropriate reduction in width or span so as to accommodate the glider. This then results in a local deformation of the slot about the glider as the glider moves axially along the guide rail. This local constriction and deformation can cause the slot to pinch the connection between the exterior and interior portions of the glider and thus reduce the amount of rotational play within the slot, increasing the tightness of the fit, and thus provide an added measure of precision in relative movement of the platform. As such this relative deformation and expansion will result in a reduction in play or degrees of unwanted freedom will increase the reliability of the calculated position of the movable platform of the system. This compression and associated deformation also decreases the successive creep of degrees of freedom into the system as wear occurs between the sliding components as small gaps are produced from such wear because the pinching effect or deformation will minimize the gaps as they are generated. If the load bearing surface wears over time, the guide rail can thus expand outward to compensate for wear by closing the gap between the mating surfaces between the guide rail and its associated glider.

It will be appreciated that the movable platform can be provided with any number of fabrication methods from machining tools such as routers, drills, cutting tools, or alternatively additive materials such as printer heads or nozzles. In other embodiments the movable platform can be configured to hold an item to be machined and the respective machining tools held stationary about the base. Alternatively, the movable platform can function as the printing surface for additive manufacturing or 3D printing.

In some embodiments the fabrication platform 54 can be stationary or in yet more embodiments both the fabrication platform 54 and the movable platform 70 can be configured to move simultaneously.

Additionally, in the embodiments shown, the slot 110 is illustrated as facing the working area 14, however, the slot can be provided through the side wall of the guide rail in virtually any direction. It will be appreciated that for some fabrication methods, such as material removal type machining, that it may be of some benefit to orient the slot so as to face away from the working area in a radially outward direction.

Figure 24B:
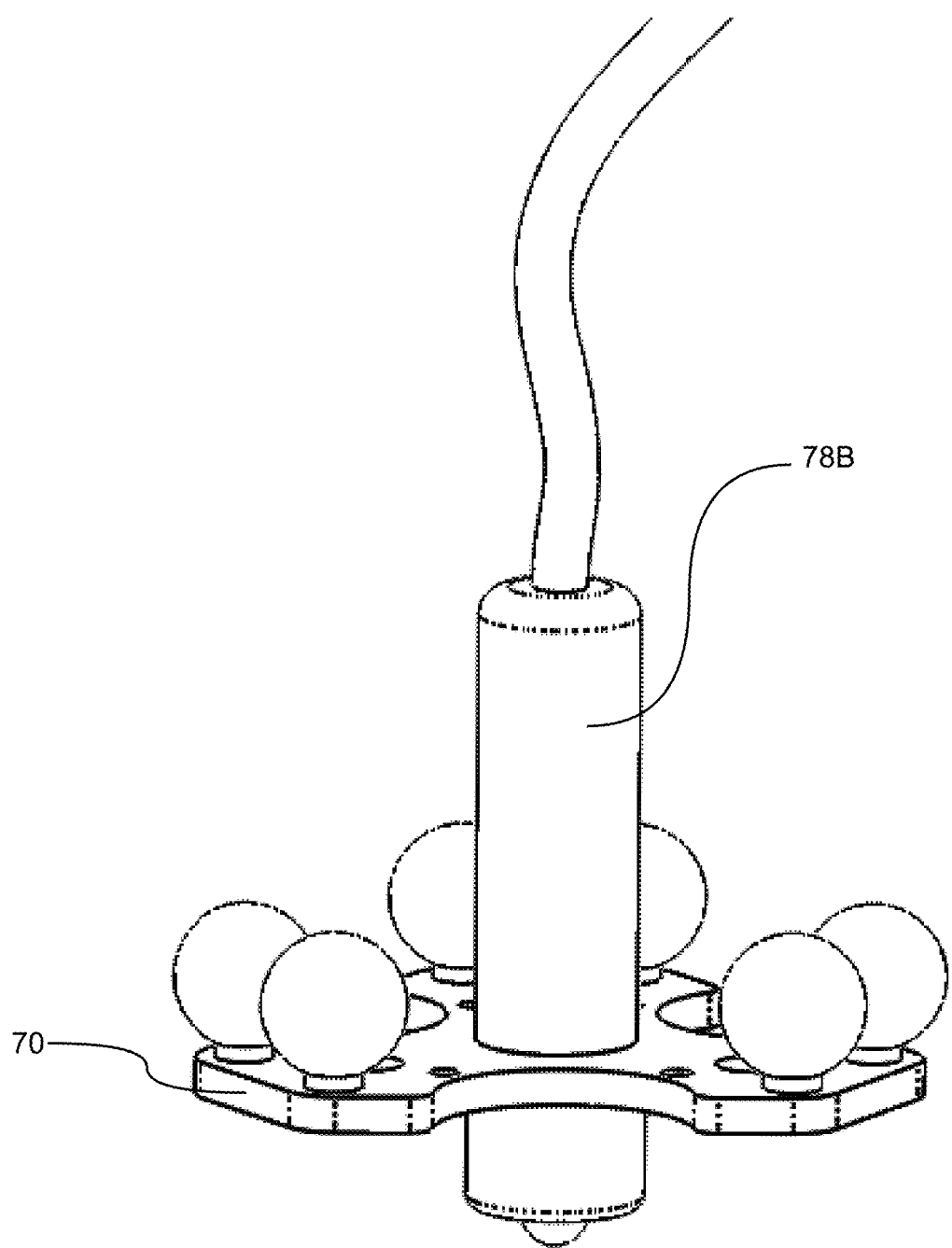
Figure 24C:
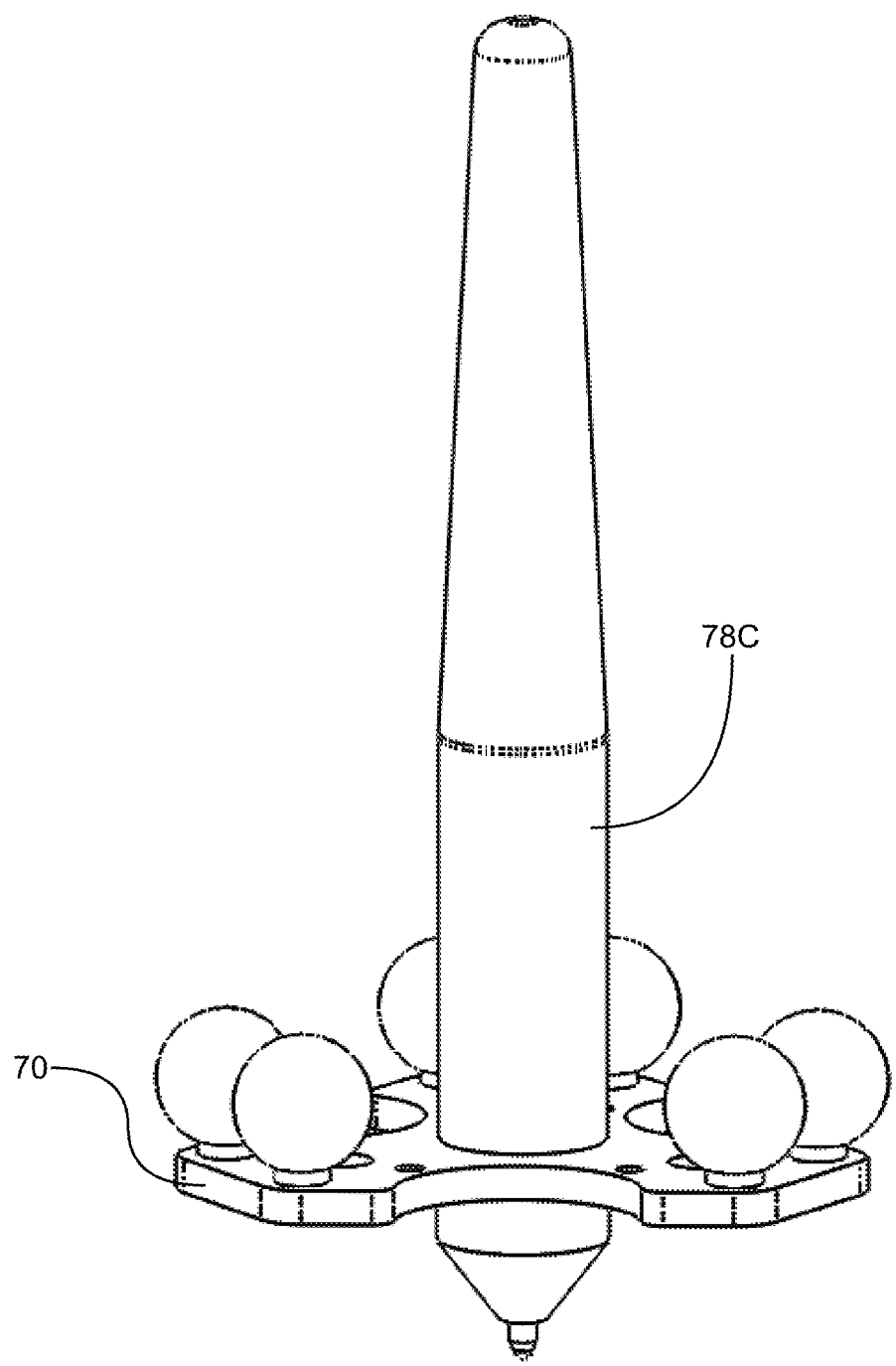

FIGS. 24A-C illustrate various types of fabrication apparatus types which are usable within the system and apparatus discussed above. In particular FIG. 24A illustrates a movable platform 70 with an additive material head 78A, i.e. a 3D printer head, FIG. 24B illustrates a movable platform 70 with a laser head 78B, and FIG. 24C illustrates a movable platform 70 with a plotting head 78C. It will be appreciated, as discussed above, that any number of fabrication mechanisms ranging from pens and pencils for drawing, router motors and bits for fabrication, cutting tools, different types of lasers, 3D printing heads and nozzles whether naturally curing or accelerated curing ultraviolet lights or other curing means can all be used in conjunction with the movable platform in the working area of the disclosed device. It will be further appreciated that the embodiments shown are for illustrative purposes only, with the understanding that the movable platform can alternatively be utilized to move an item or work piece with respect to a stationary fabrication mechanisms or fabrication mechanisms which are otherwise movable in the working area by alternative means.

Figure 25:
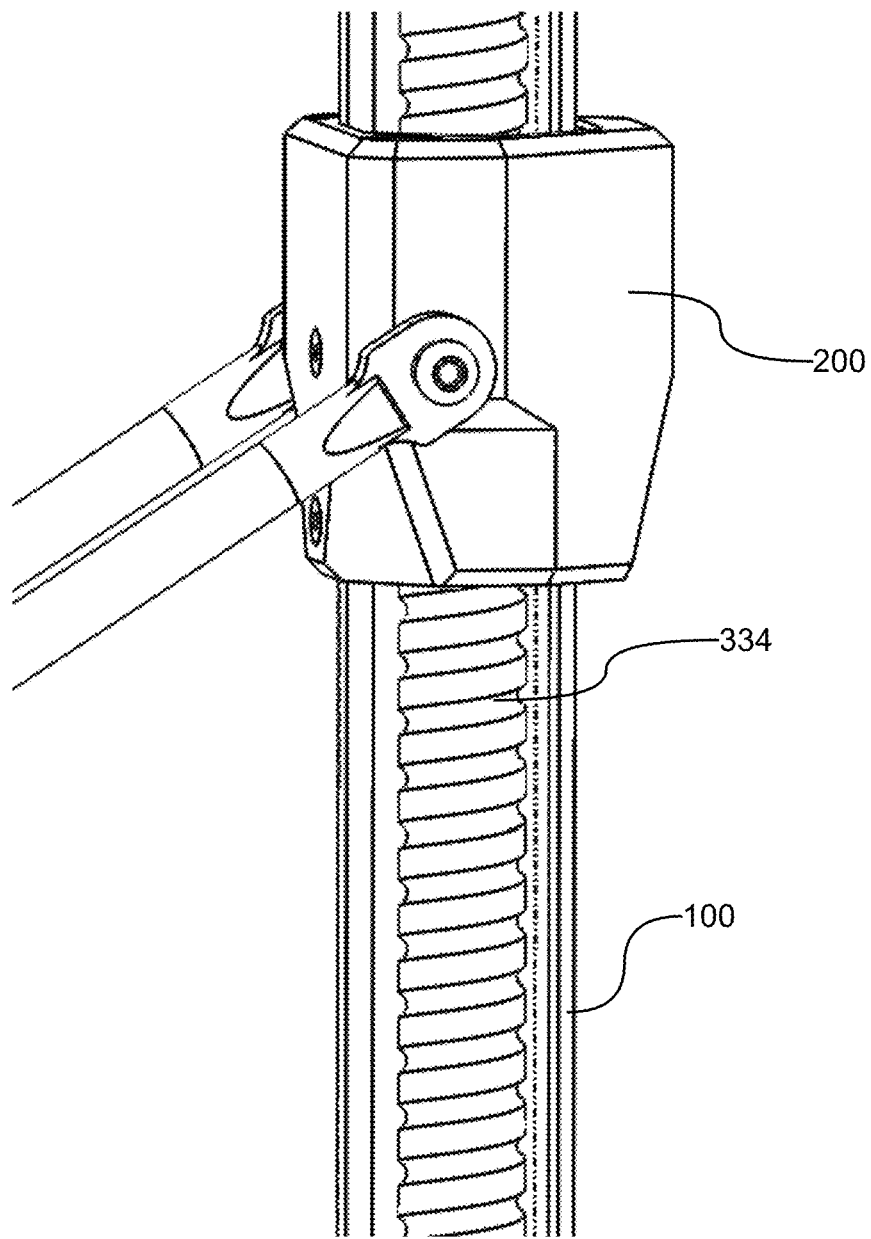
FIG. 25 illustrates a partially transparent perspective view of a glider utilizing an alternative drive means for facilitating axial translation.

FIG. 25 illustrates an alternative drive means in the form of a lead screw 334 or worm gear which can interact with a threaded guide hole through the interior portion of the glider 200 such that rotational motion induces axial translation of the glider 200 about the guide rail 100.

Figure 26:
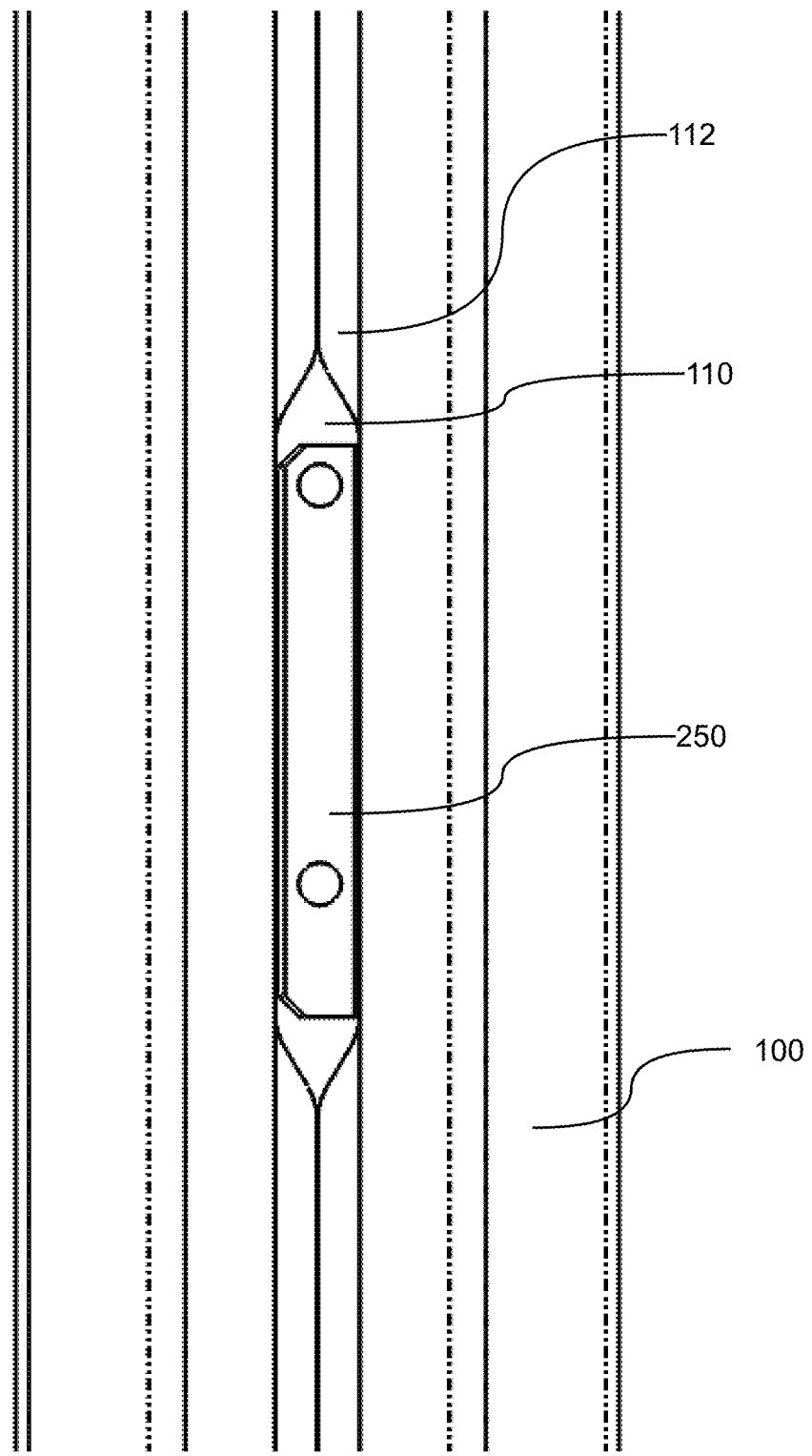
FIG. 26 illustrates a front view of an internal portion of a glider within a guide rail utilizing an environmental seal.

FIG. 26 illustrates an environmental seal 112 which can be formed of a resilient material such as rubber, fabric, polymer, or a deformable metallic sheet which can be configured so as to deform around the interior portion 250 of each glider as the glider translates through the slot 110 along the axis of its respective guide rail 100. It will be appreciated that the environmental seal 112 can be formed of two components which extend from opposing edges of the slot toward a central portion of the slot 110. In some embodiments the environmental seal 112 can be provided about the exterior surface of the guide rail 100, or in a channel within the slot 110 or along an interior surface so as to best meet the specific design or environmental conditions of the respective working area and fabrication materials.

Figure 27:
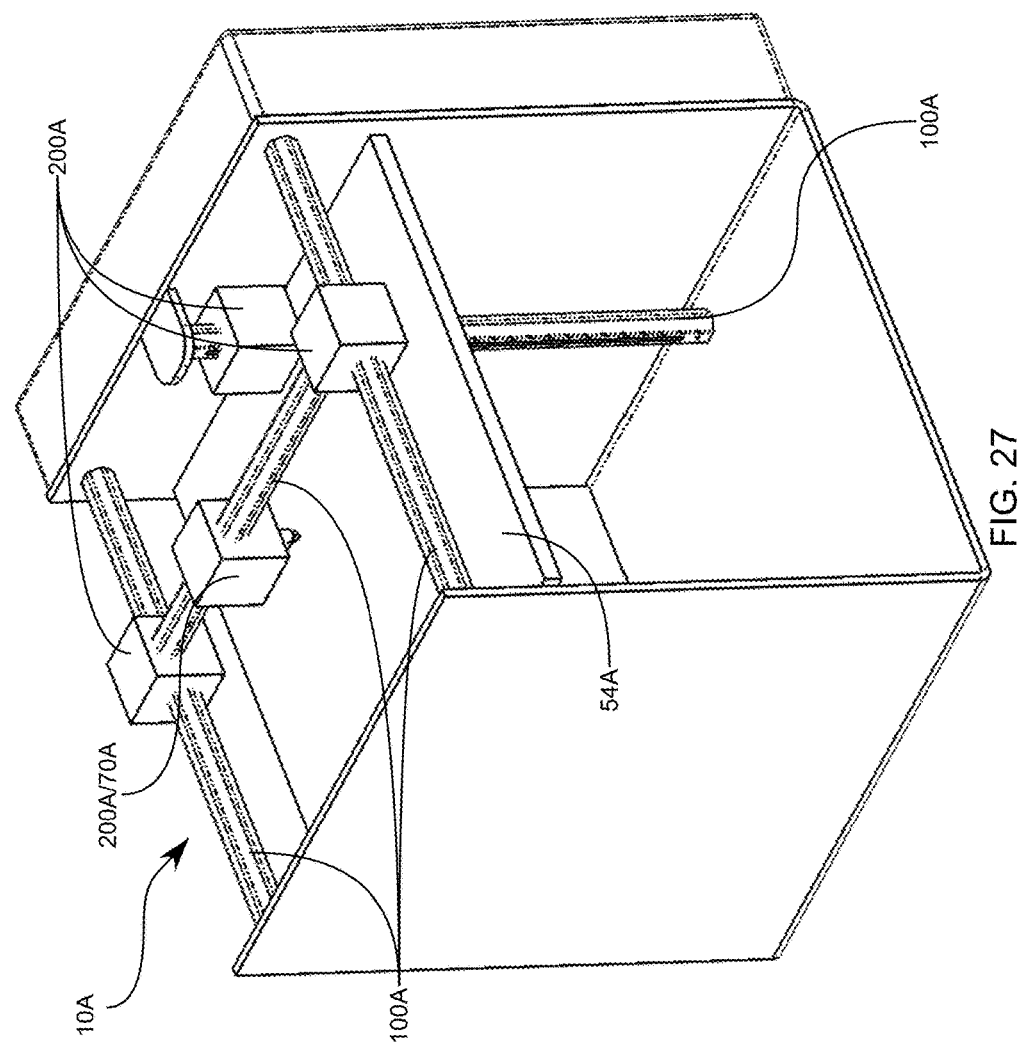
FIG. 27 illustrates an alternative fabrication apparatus and system for facilitating three dimensional motion using a Cartesian coordinate setup utilizing similar guide rails and gliders as the embodiments shown in FIGS. 1-24.

FIG. 27 illustrates a fabrication apparatus and system for facilitating three dimensional motion of an object utilizing a Cartesian arrangement of guide rails 100A with associated gliders 200A. It will be appreciated that a similar fabrication platform 54A can also be translated axially using a guide rail 100A and another associated glider 200A. The movable platform 70A in this arrangement can be integrated into a glider 200A. It will be appreciated that the gliders 200A and the guide rails 100A can include any of the features and arrangements as discussed above with respect to the parallel arm embodiment discussed in FIGS. 1-23.

In some embodiments it will be appreciated that additional actuation mechanisms can be provided between the movable platform and the fabrication apparatus attached thereto so as to allow for appropriate angling of machining tools or material extrusion with respect to an item being fabricated thereby.

Additionally, the embodiments shown herein illustrate each of the guide rails as being suspended between opposing support structures, however the guide rails can be cantilevered in a single direction, or any number of alternative structures can be used so as to ensure proper relative positions so as to suit the tolerances of the desired fabrication function.

Additionally, as one of the main benefits of the present system is to protect the drive mechanism and interface from contamination and associated fouling, from such contamination, an alternative embodiment can employ a magnetic coupling between the outer portion and the inner portion of each glider, the magnetic coupling having a sufficient force so as to eliminate the need for the slot through each respective guide rail completely, thus providing a completely sealed side wall which would resist contamination even more completely than the embodiments described above. It will thus be recognized, that a keyed interface, i.e. non-circular outer surface of the guide rail and corresponding inner surface of the outer portion of each glider will be required so as to provide proper location and resist twist between a magnetically coupled glider and associated guide rail.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Further, discussion with regard to any of the specific features is intended to be for illustrative purposes, with the understanding that any feature discussed herein can be used in combination with any number of other features in any combination. Accordingly, it is not intended that the invention be limited, except as by the claims set forth below.

The invention claimed is:

1. A fabrication apparatus and system for facilitating three dimensional motion of an object within the system, the apparatus comprising:
    a working area;
    a plurality of guide rails disposed about a perimeter of the working area, each of the plurality of guide rails further comprising:
        an extended axial body having a rigid side wall and an outer surface;
        a hollow interior cavity; and
        a slot extending through the side wall, the slot being parallel to a main central axis of each guide rail;
    a plurality of gliders, at least one glider corresponding to each of the guide rail of the plurality of guide rails, each of the plurality of gliders further comprising:
        an exterior portion configured to substantially encompass each of the guide rails of the plurality of guide rails about the outer surface thereof; and
        an interior portion residing within the hollow interior cavity of the guide rail;
    a drive mechanism configured to provide a driving force to each of the plurality of gliders to cause axial translation of each of the plurality of gliders along their respective guide rails; and
    a movable platform suspended between the plurality of the gliders within the working area by a plurality of rods being connected to the plurality of gliders, wherein movement of the movable platform is effectuated by axial translation of one or more of the plurality of gliders along their respective guide rail.

2. The fabrication apparatus of claim 1, wherein the outer surface of each of the guide rails has at least one planar surface.

3. The fabrication apparatus of claim 1, wherein the driving force of the drive mechanism is applied directly to the interior portion of each glider.

4. The fabrication apparatus of claim 1, wherein the drive mechanism includes a drive member located about a first end of each of the plurality of guide rails, a tension member extending through the hollow interior cavity being affixed to the interior portion of at least one associated glider, and wherein a pulley is provided at a second end so as to provide bi-directional motion of the glider.

5. The fabrication apparatus of claim 4, further comprising:
    a tension adjustment mechanism configured to move the pulley along the axial direction of each respective guide rail of the plurality of guide rails so as to provide a proper tension to the tension member.

6. The fabrication apparatus of claim 4, wherein the tension member is a belt.

7. The fabrication apparatus of claim 4, wherein the tension member is a drive chain.

8. The fabrication apparatus of claim 1, wherein each glider of the plurality of gliders applies a compressive force to the outer surface at radially spaced apart intervals of each respective guide rail of the plurality of guide rails so as to provide a local compressive deformation of the slot about each glider.

9. The fabrication apparatus of claim 1, wherein the movable platform includes a print nozzle configured to provide an additive material for additive material fabrication.

10. The fabrication apparatus of claim 1, wherein the movable platform includes a print surface configured to receive an additive material for additive material fabrication.

* * * * *